United States Patent
Larsson et al.

(10) Patent No.: US 11,128,517 B2
(45) Date of Patent: Sep. 21, 2021

(54) HANDLING DIFFERENT SUBFRAME SETS FOR UPLINK 256QAM

(71) Applicant: TELEFONAKTIEBOLAGET L M ERICSSON (PUBL), Stockholm (SE)

(72) Inventors: Daniel Larsson, Lund (SE); Jung-Fu Cheng, Fremont, CA (US)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 0 days.

(21) Appl. No.: 16/084,715

(22) PCT Filed: Mar. 30, 2017

(86) PCT No.: PCT/IB2017/051832
§ 371 (c)(1),
(2) Date: Sep. 13, 2018

(87) PCT Pub. No.: WO2017/168369
PCT Pub. Date: Oct. 5, 2017

(65) Prior Publication Data
US 2019/0089573 A1    Mar. 21, 2019

Related U.S. Application Data

(60) Provisional application No. 62/316,746, filed on Apr. 1, 2016.

(51) Int. Cl.
*H03D 3/24* (2006.01)
*H04L 27/38* (2006.01)
(Continued)

(52) U.S. Cl.
CPC .......... *H04L 27/38* (2013.01); *H04B 17/336* (2015.01); *H04L 1/001* (2013.01); *H04L 1/0003* (2013.01);
(Continued)

(58) Field of Classification Search
CPC ....... H04L 27/38; H04L 1/0003; H04L 1/001; H04L 1/1812; H04L 1/1845; H04L 1/1887; H04L 5/0055; H04B 17/336
(Continued)

(56) References Cited

U.S. PATENT DOCUMENTS

2005/0288019 A1   12/2005  Park et al.
2015/0133179 A1*  5/2015  Li ..................... H04W 52/146
                                              455/522
(Continued)

FOREIGN PATENT DOCUMENTS

JP    2012156900 A    8/2012
WO    2008105162 A1    9/2008
(Continued)

OTHER PUBLICATIONS

Ericsson, "Physical layer design aspects of UL 256OAM", 3GPP TSG-RAN WG1 Meeting #84bis, R1-163347, Apr. 11-15, 2016.
(Continued)

*Primary Examiner* — Zewdu A Kassa

(57) ABSTRACT

Systems and methods are disclosed herein for configuring a wireless device individually (i.e., separately) per uplink subframe set as to whether or not the wireless device can use uplink 256 Quadrature Amplitude Modulation (256QAM). In some embodiments, a method of operation of a network node comprises configuring a wireless device for use of a Modulation and Coding Scheme (MCS) table for uplink 256QAM separately per uplink subframe set for two or more uplink subframe sets. In some embodiments, the two or more uplink subframe sets are two or more uplink subframe sets for separate uplink power control. In this manner, 256QAM can be utilized in more subframes and, as a result, uplink data rate can be increased.

21 Claims, 13 Drawing Sheets

(51) Int. Cl.
*H04L 1/00* (2006.01)
*H04L 1/18* (2006.01)
*H04B 17/336* (2015.01)
*H04L 5/00* (2006.01)

(52) U.S. Cl.
CPC .......... *H04L 1/0009* (2013.01); *H04L 1/1812* (2013.01); *H04L 1/1845* (2013.01); *H04L 1/1887* (2013.01); *H04L 5/0055* (2013.01)

(58) Field of Classification Search
USPC ................. 375/320, 316, 219, 295
See application file for complete search history.

(56) References Cited

U.S. PATENT DOCUMENTS

| 2015/0312071 | A1* | 10/2015 | Chen | ................. H04L 27/0008 370/329 |
| 2017/0111202 | A1* | 4/2017 | Kim | ................. H04L 27/0008 |
| 2017/0171014 | A1* | 6/2017 | Chen | ........................ H04L 1/00 |

FOREIGN PATENT DOCUMENTS

| WO | 2013051983 A1 | 4/2013 |
| WO | 2015099515 A1 | 7/2015 |
| WO | 2015169013 A1 | 11/2015 |
| WO | 2015178725 A1 | 11/2015 |

OTHER PUBLICATIONS

Ericsson et al., "New Work Item on Uplink Capacity Enhancements for LTE", 3GPP TSG RAN Meeting #71, RP-160664, Mar. 7-10, 2016, 9 pages.

3rd Generation Partnership Project, "3rd Generation Partnership Project; Technical Specification Group Radio Access Network; Evolved Universal Terrestrial Radio Access (E-UTRA); Physical layer procedures (Release 13)",Technical Specification, 3GPP TS 36.213 V13.1.1, pp. 13-44, Mar. 2016, 3GPP, France.

Dahlman et al., "4G: LTE/LTE—Advanced for Mobile Broadband, Second Edition," 2014, pp. 299-319, Academic Press, United Kingdom.

Qualcomm Inc., "Summary of Ad-hoc session on Further Enhancements to LTE TDD for DL-UL Interference Management and Traffic Adaptation", 3GPP TSG RAN WG1 Meeting #76bis, R1-141871, Mar. 31-Apr. 4, 2014, 3 pages.

Blackberry UK Limited, "Remaining Issues for 256 QAM Configuration and Signalling", 3GPP TSG RAN WG1 Meeting #77, Seoul, Korea, May 19-23, 2014, R1-142353, Mar. 7-10, 2016, 4 pages.

* cited by examiner

Uplink/downlink time/frequency structure for LTE in case of FDD and TDD

Different downlink/uplink configurations in case of TDD

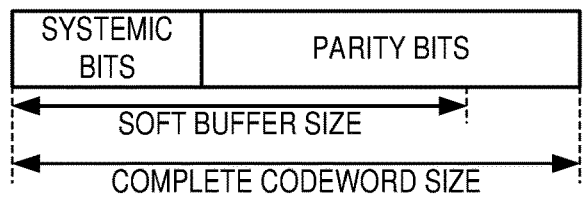
FIG. 8
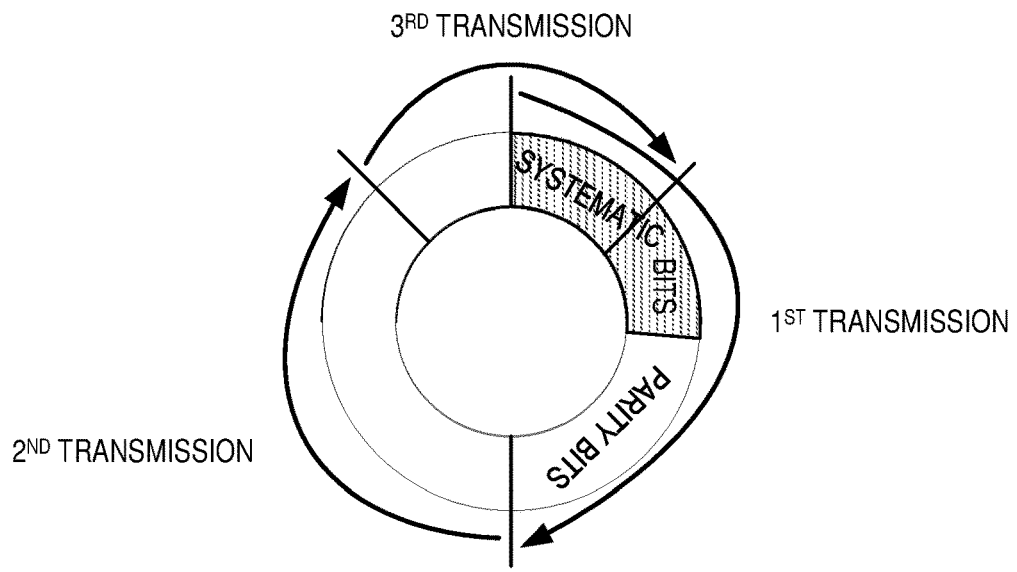
FIG. 9
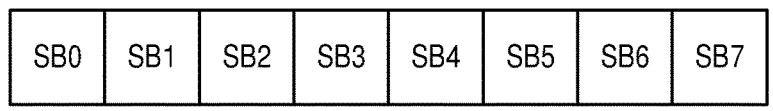
FIG. 10
| SB0a | SB1a | SB2a | SB3a | SB4a | SB5a | SB6a | SB7a |
|------|------|------|------|------|------|------|------|
| SB0b | SB1b | SB2b | SB3b | SB4b | SB5b | SB6b | SB7b |
FIG. 11

```
┌─────────────────────────────────────────────┐
│ CONFIGURE A WIRELESS DEVICE FOR USE OF A MCS│
│ TABLE FOR UL 256QAM SEPARATELY PER UL (E.G.,│
│ POWER CONTROL) SUBFRAME SET (E.G., CONFIGURE│
│ THE WIRELESS DEVICE TO USE THE MCS TABLE FOR│
│ UL 256QAM FOR ONE UL SUBFRAME SET AND       │
│ CONFIGURE THE WIRELESS DEVICE NOT TO USE    │
│ THE MCS TABLE FOR UL 256 QAM FOR ANOTHER    │
│ UL SUBFRAME SET)                            │
│                    100                      │
└─────────────────────────────────────────────┘
                      │
                      ▼
┌─ ─ ─ ─ ─ ─ ─ ─ ─ ─ ─ ─ ─ ─ ─ ─ ─ ─ ─ ─ ─ ─ ┐
  RECEIVE AN UPLINK TRANSMISSION FROM THE
│ WIRELESS DEVICE IN A SUBFRAME IN ACCORDANCE │
  WITH THE CONFIGURATION OF THE WIRELESS
│ DEVICE FOR USE OF THE MCS TABLE FOR 256QAM  │
  FOR THE CORRESPONDING UL SUBFRAME SET
│                    102                      │
└─ ─ ─ ─ ─ ─ ─ ─ ─ ─ ─ ─ ─ ─ ─ ─ ─ ─ ─ ─ ─ ─ ┘
```

FIG. 13

```
┌─────────────────────────────────────────────┐
│ OBTAIN A SEPARATE CONFIGURATION PER UL      │
│ (E.G., POWER CONTROL) SUBFRAME SET FOR USE  │
│ OF A MCS TABLE FOR UL 256QAM (E.G.,         │
│ CONFIGURATION TO USE THE MCS TABLE FOR UL   │
│ 256QAM FOR ONE UL SUBFRAME SET AND          │
│ CONFIGURATION NOT TO USE THE MCS TABLE      │
│ FOR UL 256 QAM FOR ANOTHER UL SUBFRAME SET) │
│                    200                      │
└─────────────────────────────────────────────┘
                      │
                      ▼
┌─ ─ ─ ─ ─ ─ ─ ─ ─ ─ ─ ─ ─ ─ ─ ─ ─ ─ ─ ─ ─ ─ ┐
    TRANSMIT AN UPLINK TRANSMISSION FROM THE
│   WIRELESS DEVICE IN A SUBFRAME IN          │
    ACCORDANCE WITH THE CONFIGURATION OF THE
│   WIRELESS DEVICE FOR USE OF THE MCS TABLE  │
    FOR 256QAM FOR THE CORRESPONDING UL
│                SUBFRAME SET                 │
                     202
└─ ─ ─ ─ ─ ─ ─ ─ ─ ─ ─ ─ ─ ─ ─ ─ ─ ─ ─ ─ ─ ─ ┘
```

FIG. 14

HANDLING DIFFERENT SUBFRAME SETS FOR UPLINK 256QAM

RELATED APPLICATIONS

This application is a national stage application of International Patent Application No. PCT/IB2017/051832, filed Mar. 30, 2017, which claims the benefit of provisional patent application Ser. No. 62/316,746, filed Apr. 1, 2017, the disclosures of which are hereby incorporated herein by reference in their entireties.

TECHNICAL FIELD

The disclosed subject matter relates generally to telecommunications and more particularly to the handling of different subframe sets for uplink 256 Quadrature Amplitude Modulation (256QAM).

BACKGROUND

Long-Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 milliseconds (ms), each radio frame consisting of ten equally-sized subframes of length $T_{subframe}$=1 ms, as illustrated in FIG. 2.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of Virtual Resource Blocks (VRB) and Physical Resource Blocks (PRB) has been introduced in LTE. The actual resource allocation to a User Equipment (UE) is made in terms of VRB pairs. There are two types of resource allocations, localized and distributed. In the localized resource allocation, a VRB pair is directly mapped to a PRB pair, hence two consecutive and localized VRBs are also placed as consecutive PRBs in the frequency domain. On the other hand, the distributed VRBs are not mapped to consecutive PRBs in the frequency domain, thereby providing frequency diversity for a data channel transmitted using these distributed VRBs.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Release 11 onwards, resource assignments can also be scheduled on the enhanced Physical Downlink Control Channel (EPDCCH). For Release 8 to Release 10, only Physical Downlink Control Channel (PDCCH) is available.

Transmission and reception from a node, e.g. a UE in a cellular system such as LTE, can be multiplexed in the frequency domain or in the time domain (or combinations thereof). FIG. 4 illustrates Frequency Division Duplexing (FDD) and Time Division Duplexing (TDD). FDD implies that downlink and uplink transmission take place in different, sufficiently separated frequency bands. TDD implies that downlink and uplink transmission take place in different, non-overlapping time slots. Thus, TDD can operate in unpaired spectrum, whereas FDD requires paired spectrum.

Typically, the structure of the transmitted signal in a communication system is organized in the form of a frame structure. For example, LTE uses ten equally-sized subframes of length 1 ms per radio frame as illustrated in FIG. 5. As illustrated in the upper portion of FIG. 5, in case of FDD operation, there are two carrier frequencies, one for uplink transmission ($f_{UL}$) and one for downlink transmission ($f_{DL}$). At least with respect to the UE (i.e., a terminal) in a cellular communication system, FDD can be either full duplex or half duplex. In the full duplex case, a UE can transmit and receive simultaneously; while in half duplex operation the UE cannot transmit and receive simultaneously. However, in half duplex operation, the base station is capable of simultaneous reception/transmission though, e.g., receiving from one UE while simultaneously transmitting to another UE. In LTE, a half duplex UE is monitoring/receiving in the downlink except when explicitly being instructed to transmit in a certain subframe.

As illustrated in the lower portion of FIG. 5, in case of TDD operation, there is only a single carrier frequency, and uplink and downlink transmissions are always separated in time on a cell basis. As the same carrier frequency is used for uplink and downlink transmission, both the base station and the UEs need to switch from transmission to reception and vice versa. An essential aspect of any TDD system is to provide the possibility for a sufficiently large guard time where neither downlink nor uplink transmissions occur. This is required to avoid interference between uplink and downlink transmissions. For LTE, this guard time is provided by special subframes (subframe 1 and, in some cases, subframe 6), which are split into three parts: a downlink part (Downlink Pilot Time Slot (DwPTS)), a Guard Period (GP), and an uplink part (Uplink Pilot Time Slot (UpPTS)). The remaining subframes are either allocated to uplink or downlink transmission.

TDD allows for different asymmetries in terms of the amount of resources allocated for uplink and downlink transmission, respectively, by means of different downlink/uplink configurations. In LTE, there are seven different configurations as shown in FIG. 6. Note that in the description below, "downlink subframe" can mean either a downlink subframe or the special subframe.

To avoid severe interference between downlink and uplink transmissions between different cells, neighbor cells should have the same downlink/uplink configuration. If this is not done, uplink transmission in one cell may interfere with downlink transmission in the neighboring cell (and vice versa) as illustrated in FIG. 7. Hence, the downlink/uplink asymmetry can typically not vary between cells, but is signaled as part of the system information and remains fixed for a long period of time.

In LTE, Hybrid Automatic Repeat Request (HARQ) with incremental redundancy is used. Instead of retransmitting the same portion of the codeword, different redundancy versions are retransmitted yielding an extra gain over Chase combining. Ideally, the full buffer should be available at the receiver side such that the received soft values for the entire codeword can be stored. However, due to the UE complexity and cost concerns, the soft buffer size in a UE is limited. For higher rate transmissions (where larger codewords are sent from the transmitter), the UE may have only limited buffer capacity and is not able to store the complete codeword. Therefore, the evolved Node B (eNB) and the UE must have the same understanding about the size of the soft buffer since otherwise the eNB may transmit coded bits that the UE cannot store or the UE does not know that received coded bits are other bits and confuses them with bits that the UE stores.

FIG. 8 depicts a complete codeword and also how many soft bits the UE can store. If the eNB and the UE have the same understanding about the size of the soft buffer, the eNB never transmits coded bits that the UE cannot store. Instead, the eNB only takes those coded bits that are stored by the UE and uses those bits for (re)transmissions. This can be depicted by the circular buffer shown in FIG. 9. It is important to note that the complete circle corresponds to the size of the soft buffer and not to the entire codeword. In the first transmission, depending on the code rate, some/all systematic bits and none/some parity bits are transmitted. In a retransmission, the starting position is changed, and bits corresponding to another part of the circumference are transmitted.

In Release 8 LTE FDD, each UE has up to eight HARQ processes per component carrier, and each HARQ process can contain up to two sub-processes for supporting dual-codeword Multiple-Input-Multiple-Output (MIMO) transmissions. The design in Release 8 LTE is to divide the available soft buffer equally into the configured number of HARQ processes. Each portion of the divided soft buffer can be used to store soft values of the received codewords. In case of dual-codeword MIMO transmission, the divided soft buffer is further divided equally to store the soft values of the two received codewords.

More specifically, in Third Generation Partnership Project (3GPP) Technical Specification (TS) 36.212 Version 9.0.0, Section 5.1.4.1.2 "Bit collection, selection and transmission," the soft buffer size allocation is provisioned as below:

The circular buffer of length $K_w = 3K_\Pi$ for the r-th coded block is generated as follows:

$w_k = v_k^{(0)}$ for $k=0, \ldots, K_\Pi - 1$ $w_{K_\Pi + 2k} = v_k^{(1)}$ for $k=0, \ldots, K_\Pi - 1$ $w_{K_\Pi + 2k+1} = v_k^{(2)}$ for $k=0, \ldots, K_\Pi - 1$ Denote the soft buffer size for the transport block by $N_{IR}$ bits and the soft buffer size for the r-th code block by $N_{cb}$ bits. The size $N_{cb}$ is obtained as follows, where C is the number of code blocks computed in section 5.1.2:

$$-N_{cb} = \min\left(\left\lfloor \frac{N_{IR}}{C} \right\rfloor, K_w\right)$$

for downlink turbo coded transport channels
$N_{cb} = K_w$ for uplink turbo coded transport channels
where $N_{IR}$ is equal to:

$$N_{IR} = \left\lfloor \frac{N_{soft}}{K_{MIMO} \cdot \min(M_{DL\_HARQ}, M_{limit})} \right\rfloor$$

where:
$N_{soft}$ is the total number of soft channel bits [4].
$K_{MIMO}$ is equal to 2 if the UE is configured to receive PDSCH transmissions based on transmission modes 3, 4 or 8 as defined in section 7.1 of [3], 1 otherwise.

$M_{DL\_HARQ}$ is the maximum number of DL HARQ processes as defined in section 7 of [3].

$M_{limit}$ is a constant equal to 8.

The soft buffer allocation for the single codeword transmission modes is illustrated in FIG. 10. It can be observed that there is a buffer reserved for each codeword. The soft buffer allocation for the dual codeword transmission modes is illustrated in FIG. 11. It can be observed that the buffer reserved for each codeword is only half of the previous operating case. It is clear that the soft buffer limitation problem is particularly acute in dual codeword MIMO transmission operations. This limitation reduces the effectiveness of soft combining gains from incremental redundancy retransmissions.

With the introduction of enhanced Interference Mitigation and Traffic Adaptation (eIMTA) in LTE Release 12, multiple uplink subsets were introduced. Power control parameters for the uplink subframe sets can be configured individually by different power control parameters to allow operation during different interference conditions.

The following excerpt from section 5.1.1 of 3GPP TS 36.213 V13.0.0 explains certain aspects of uplink power control. As indicated in the excerpt, power control parameters are separately configured for different uplink subframe sets to handle different interference conditions.

5.1.1 Physical uplink shared channel
[ . . . ]
Uplink power control controls the transmit power of the different uplink physical channels.
[ . . . ]
5.1.1.1 UE Behaviour
The setting of the UE Transmit power for a Physical Uplink Shared Channel (PUSCH) transmission is defined as follows.
If the UE transmits PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) = \min\left\{\begin{array}{c} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \; [dBm] \end{array}\right\}$$

If the UE transmits PUSCH simultaneous with PUCCH for the serving cell c, then the UE transmit power $P_{PUSCH,c}(i)$ for the PUSCH transmission in subframe i for the serving cell c is given by $$P_{PUSCH,c}(i) = \min\left\{\begin{array}{c} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \; [dBm] \end{array}\right\}$$

If the UE is not transmitting PUSCH for the serving cell c, for the accumulation of TPC command received with DCI format 3/3A for PUSCH, the UE shall assume that the UE transmit power $P_{PUSCH,c}(i)$ for the PUSCH transmission in subframe i for the serving cell c is computed by $P_{PUSCH,c}(i) = \min\{P_{CMAX,c}(i), P_{O\_PUSCH,c}(1) + \alpha_c(1) \cdot PL_c + f_c(i)\}[dBm]$ where, $P_{CMAX,c}(i)$ is the configured UE transmit power defined in [6] in subframe i for serving cell c and $\hat{P}_{CMAX,c}(i)$ is the linear value of $P_{CMAX,c}(i)$. If the UE transmits PUCCH without PUSCH in subframe i for the serving cell c, for the accumulation of TPC command received with DCI format 3/3A for PUSCH, the UE shall assume $P_{CMAX,c}(i)$ as given by subclause 5.1.2.1. If the UE does not transmit PUCCH and PUSCH in subframe i for the serving cell c, for the accumulation of TPC command received with DCI format 3/3A for PUSCH, the UE shall compute $P_{CMAX,c}(i)$ assuming MPR=0 dB, A-MPR=0 dB, P-MPR=0 dB and $\Delta T_C$=0 dB, where MPR, A-MPR, P-MPR and $\Delta T_C$ are defined in [6].

$\hat{P}_{PUCCH}(i)$ is the linear value of $P_{PUCCH}(i)$ defined in subclause 5.1.2.1

$M_{PUSCH,c}(i)$ is the bandwidth of the PUSCH resource assignment expressed in number of resource blocks valid for subframe i and serving cell c.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, when j=0, $P_{O\_PUSCH,c}(0)=P_{O\_UE\_PUSCH,c,2}(0)+P_{O\_NOMINAL\_PUSCH,c,2}(0)$, where j=0 is used for PUSCH (re)transmissions corresponding to a semi-persistent grant. $P_{O\_UE\_PUSCH,c,2}(0)$ and $P_{O\_NOMINAL\_PUSCH,c,2}(0)$ are the parameters p0-UE-PUSCH-Persistent-SubframeSet2-r12 and p0-NominalPUSCH-Persistent-SubframeSet2-r12 respectively provided by higher layers, for each serving cell c.

when j=1, $P_{O\_PUSCH,c}(1)=P_{O\_UE\_PUSCH,c,2}(1)+P_{O\_NOMINAL\_PUSCH,c,2}(1)$, where j=1 is used for PUSCH (re)transmissions corresponding to a dynamic scheduled grant. $P_{O\_UE\_PUSCH,c,2}(1)$ and $P_{O\_NOMINAL\_PUSCH,c,2}(1)$ are the parameters p0-UE-PUSCH-SubframeSet2-r12 and p0-NominalPUSCH-SubframeSet2-r12 respectively, provided by higher layers for serving cell c.

when j=2, $P_{O\_PUSCH,c}(2) \times P_{O\_UE\_PUSCH,c}(2)+P_{O\_NOMINAL\_PUSCH,c}(2)$ where $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower [8] ($P_{O\_PRE}$) and $\Delta_{PREAMBLE\_Msg3}$ are signalled from higher layers for serving cell c, where j=2 is used for PUSCH (re)transmissions corresponding to the random access response grant.

Otherwise $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower [8] ($P_{O\_PRE}$) and $\Delta_{PREAMBLE\_Msg3}$ are signalled from higher layers for serving cell c.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, For j=0 or 1, $\alpha_c(j)=\alpha_{c,2} \in \{0, 0.4, 0.5, 0.6, 0.7, 0.8, 0.9, 1\}$. $\alpha_{c,2}$ is the parameter alpha-SubframeSet2-r12 provided by higher layers for each serving cell c.

For j=2, $\alpha_c(j)=1$.

Otherwise

For j=0 or 1, $\alpha_c \in \{0, 0.4, 0.5, 0.6, 0.7, 0.8, 0.9, 1\}$ is a 3-bit parameter provided by higher layers for serving cell c. For j=2, $\alpha_c(j)=1$.

$PL_c$ is the downlink path loss estimate calculated in the UE for serving cell c in dB and $PL_c$=referenceSignalPower – higher layer filtered RSRP, where referenceSignalPower is provided by higher layers and RSRP is defined in [5] for the reference serving cell and the higher layer filter configuration is defined in [11] for the reference serving cell.

If serving cell c belongs to a TAG containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking defined in [11] is used as the reference serving cell for determining referenceSignalPower and higher layer filtered RSRP.

If serving cell c belongs to a TAG containing the PSCell then, for the uplink of the PSCell, the PSCell is used as the reference serving cell for determining referenceSignalPower and higher layer filtered RSRP; for the uplink of the secondary cell other than PSCell, the serving cell configured by the higher layer parameter pathlossReferenceLinking defined in [11] is used as the reference serving cell for determining referenceSignalPower and higher layer filtered RSRP.

If serving cell c belongs to a TAG not containing the primary cell or PSCell then serving cell c is used as the reference serving cell for determining referenceSignalPower and higher layer filtered RSRP.

$\Delta_{TF,c}(i)=10\log_{10}((2^{BPRE \cdot K_s}-) \cdot \beta_{offset}^{PUSCH})$ for $K_S$=1.25 and 0 for $K_S$=0 where $K_S$ is given by the parameter deltaMCS-Enabled provided by higher layers for each serving cell C. BPRE and $\beta_{offset}^{PUSCH}$, for each serving cell c, are computed as below. $K_S$=0 for transmission mode 2.

BPRE=$O_{CQI}/N_{RE}$ for control data sent via PUSCH without UL-SCH data and $$\sum_{r=0}^{C-1} K_r/N_{RE}$$

for other cases.

where C is the number of code blocks, $K_r$ is the size for code block r, $O_{CQI}$ is the number of CQI/PMI bits including CRC bits and $N_{RE}$ is the number of resource elements determined as $N_{RE}=M_{sc}^{PUSCH\text{-}initial} \cdot N_{symb}^{PUSCH\text{-}initial}$, where $C$, $K_r$, $M_{sc}^{PUSCH\text{-}initial}$ and $N_{symb}^{PUSCH\text{-}initial}$ are defined in [4].

$\beta_{offset}^{PUSCH} = \beta_{offset}^{CQI}$ for control data sent via PUSCH without UL-SCH data and 1 for other cases.

$\delta_{PUSCH,c}$ is a correction value, also referred to as a TPC command and is included in PDCCH/EPDCCH with DCI format 0/4 for serving cell c or jointly coded with other TPC commands in PDCCH with DCI format 3/3A whose CRC parity bits are scrambled with TPC-PUSCH-RNTI. If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c is given by $f_{c,2}(i)$, and the UE shall use $f_{c,2}(i)$ instead of $f_c(1)$ to determine $P_{PUSCH,c}(i)$. Otherwise, the current PUSCH power control adjustment state for serving cell c is given by $f_c(i)$. $f_{c,2}(i)$ and $f_c(i)$ are defined by:

$f_c(1)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$ if accumulation is enabled based on the parameter Accumulation-enabled provided by higher layers or if the TPC command $\delta_{PUSCH,c}$ is included in a PDCCH/EPDCCH with DCI format 0 for serving cell c where the CRC is scrambled by the Temporary C-RNTI where $\delta_{PUSCH,c}(i-K_{PUSCH})$ was signalled on PDCCH/EPDCCH with DCI format 0/4 or PDCCH with DCI format 3/3A on subframe $i-K_{PUSCH}$, and where $f_c(0)$ is the first value after reset of accumulation.

The value of $K_{PUSCH}$ is

For FDD or FDD-TDD and serving cell frame structure type 1, $K_{PUSCH}=4$

For TDD, if the UE is configured with more than one serving cell and the TDD UL/DL configuration of at least two configured serving cells is not the same, or if the UE is configured with the parameter EIMTA-MainConfigServCell-r12 for at least one serving cell, or for FDD-TDD and serving cell frame structure type 2, the "TDD UL/DL configuration" refers to the UL-reference UL/DL configuration (defined in subclause 8.0) for serving cell c.

For TDD UL/DL configurations 1-6, $K_{PUSCH}$ is given in Table 5.1.1.1-1

For TDD UL/DL configuration 0

If the PUSCH transmission in subframe 2 or 7 is scheduled with a PDCCH/EPDCCH of DCI format 0/4 in which the LSB of the UL index is set to 1, $K_{PUSCH}=7$ For all other PUSCH transmissions, $K_{PUSCH}$ is given in Table 5.1.1.1-1.

For serving cell c the UE attempts to decode a PDCCH/EPDCCH of DCI format 0/4 with the UE's C-RNTI or DCI format 0 for SPS C-RNTI and a PDCCH of DCI format 3/3A with this UE's TPC-PUSCH-RNTI in every subframe except when in DRX or where serving cell c is deactivated.

If DCI format 0/4 for serving cell c and DCI format 3/3A are both detected in the same subframe, then the UE shall use the $\delta_{PUSCH,c}$ provided in DCI format 0/4.

$\delta_{PUSCH,c}=0$ dB for a subframe where no TPC command is decoded for serving cell c or where DRX occurs or i is not an uplink subframe in TDD or FDD-TDD and serving cell c frame structure type 2.

The $\delta_{PUSCH,c}$ dB accumulated values signalled on PDCCH/EPDCCH with DCI format 0/4 are given in Table 5.1.1.1-2. If the PDCCH/EPDCCH with DCI format 0 is validated as a SPS activation or release PDCCH/EPDCCH, then $\delta_{PUSCH,c}$ is 0 dB.

The $\delta_{PUSCH}$ dB accumulated values signalled on PDCCH with DCI format 3/3A are one of SET1 given in Table 5.1.1.1-2 or SET2 given in Table 5.1.1.1-3 as determined by the parameter TPC-Index provided by higher layers.

If UE has reached $P_{CMAX,c}(i)$ for serving cell c, positive TPC commands for serving cell c shall not be accumulated If UE has reached minimum power, negative TPC commands shall not be accumulated If the UE is not configured with higher layer parameter UplinkPowerControlDedicated-v12x0 for serving cell c, the UE shall reset accumulation For serving cell c, when $P_{O\_UE\_PUSCH,c}$ value is changed by higher layers For serving cell c, when the UE receives random access response message for serving cell c If the UE is configured with higher layer parameter UplinkPowerControlDedicated-v12x0 for serving cell c, the UE shall reset accumulation corresponding to $f_c(*)$ for serving cell c when $P_{O\_UE\_PUSCH,c}$ value is changed by higher layers when the UE receives random access response message for serving cell c the UE shall reset accumulation corresponding to $f_{c,2}(*)$ for serving cell c when $P_{O\_UE\_PUSCHc,2}$ value is changed by higher layers If the UE is configured with higher layer parameter UplinkPowerControlDedicated-v12x0 for serving cell c and if subframe i belongs to uplink power control subframe set 2 as indicated by the higher layer parameter tpc-SubframeSet-r12 $f_c(i)=f_c(i-1)$ if subframe/does not belong to uplink power control subframe set 2 as indicated by the higher layer parameter tpc-SubframeSet-r12 $f_{c,2}(i)=f_{c,2}(i-1)$ $f_c(i)=\delta_{PUSCH,c}(i-K_{PUSCH})$ and $f_{c,2}(i)=\delta_{PUSCH,c}(i-K_{PUSCH})$ if accumulation is not enabled for serving cell c based on the parameter Accumulation-enabled provided by higher layers where $\delta_{PUSCH,c}(i-K_{PUSCH})$ was signalled on PDCCH/EPDCCH with DCI format 0/4 for serving cell c on subframe $i-K_{PUSCH}$ The value of $K_{PUSCH}$ is For FDD or FDD-TDD and serving cell frame structure type 1, $K_{PUSCH}=4$ For TDD, if the UE is configured with more than one serving cell and the TDD UL/DL configuration of at least two configured serving cells is not the same, or if the UE is configured with the parameter EIMTA-MainConfigServ-Cell-r12 for at least one serving cell, or FDD-TDD and serving cell frame structure type 2, the "TDD UL/DL configuration" refers to the UL-reference UL/DL configuration (defined in subclause 8.0) for serving cell c.

For TDD UL/DL configurations 1-6, $K_{PUSCH}$ is given in Table 5.1.1.1-1.

For TDD UL/DL configuration 0

If the PUSCH transmission in subframe 2 or 7 is scheduled with a PDCCH/EPDCCH of DCI format 0/4 in which the LSB of the UL index is set to 1, $K_{PUSCH}=7$ For all other PUSCH transmissions, $K_{PUSCH}$ is given in Table 5.1.1.1-1.

The $\delta_{PUSCH,c}$ dB absolute values signalled on PDCCH/EPDCCH with DCI format 0/4 are given in Table 5.1.1.1-2. If the PDCCH/EPDCCH with DCI format 0 is validated as a SPS activation or release PDCCH/EPDCCH, then $\delta_{PUSCH,c}$ is 0 dB.

$f_c(i)=f_c(i-1)$ and $f_{c,2}(i)=f_{c,2}(i-1)$ for a subframe where no PDCCH/EPDCCH with DCI format 0/4 is decoded for serving cell c or where DRX occurs or i is not an uplink subframe in TDD or FDD-TDD and serving cell c frame structure type 2.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12 $f_c(i)=f_c(i-1)$ if subframe i does not belong to uplink power control subframe set 2 as indicated by the higher layer parameter tpc-SubframeSet-r12 $f_{c,2}(i)=f_{c,2}(i-1)$ For both types of $f_c$ (*) (accumulation or current absolute) the first value is set as follows:

If $P_{O\_UE\_PUSCH,c}$ value is changed by higher layers and serving cell c is the primary cell or, if $P_{O\_UE\_PUSCH,c}$ value is received by higher layers and serving cell c is a Secondary cell $f_c(0)=0$ Else If the UE receives the random access response message for a serving cell c $f_c(0)=\Delta P_{rampup,c}+\delta_{msg2,c}$ where $\delta_{msg2,c}$ is the TPC command indicated in the random access response corresponding to the random access preamble transmitted in the serving cell c, see subclause 6.2, and $$\Delta P_{rampup,c} = \min\left\{\left[\max\left(0, P_{CMAX,c} - \left(\begin{array}{c}10\log_{10}(M_{PUSCH,c}(0)) + \\ P_{O\_PUSCH,c}(2) + \delta_{msg2} + \\ \alpha_c(2) \cdot PL + \Delta_{TF,c}(0)\end{array}\right)\right)\right], \Delta P_{rampuprequested,c}\right\}$$

and $\Delta P_{rampuprequested,c}$ is provided by higher layers and corresponds to the total power ramp-up requested by higher layers from the first to the last preamble in the serving cell c, $M_{PUSCH,c}(0)$ is the bandwidth of the PUSCH resource assignment expressed in number of resource blocks valid for the subframe of first PUSCH transmission in the serving cell c, and $\Delta_{TF,c}(0)$ is the power adjustment of first PUSCH transmission in the serving cell c.

If $P_{O\_UE\_PUSCH,c,2}$ value is received by higher layers for a serving cell c.

$f_{c,2}(0)=0$

TABLE 5.1.1.1-1

$K_{PUSCH}$ for TDD configuration 0-6

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

TABLE 5.1.1.1-2

Mapping of TPC Command Field in DCI format 0/3/4 to absolute and accumulated $\delta_{PUSCH,c}$ values

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 5.1.1.1-3

Mapping of TPC Command Field in DCI format 3A to accumulated $\delta_{PUSCH,c}$ values

| TPC Command Field in DCI format 3A | Accumulated $\delta_{PUSCH,c}$ [dB] |
|---|---|
| 0 | −1 |
| 1 | 1 |

If the UE is not configured with an SCG or a PUCCH-SCell, and if the total transmit power of the UE would exceed $P_{CMAX}(i)$, the UE scales $\hat{P}_{PUSCH,c}(i)$ for the serving cell c in subframe i such that the condition $$\sum_c w(i) \cdot \hat{P}_{PUSCH,c}(i) \leq \left(\hat{P}_{CMAX}(i) - \hat{P}_{PUCCH}(i)\right)$$

is satisfied where $\hat{P}_{PUCCH}(i)$ is the linear value of $P_{PUCCH,c}(i)$, $\hat{P}_{PUSCH,c}(i)$ is the linear value of $P_{PUSCH,c}(i)$, $\hat{P}_{CMAX}(i)$ is the linear value of the UE total configured maximum output power $P_{CMAX}$ defined in [6] in subframe i and w(i) is a scaling factor of $\hat{P}_{PUSCH,c}(i)$ for serving cell c where $0 \leq w(i) \leq 1$. In case there is no PUCCH transmission in subframe i $\hat{P}_{PUCCH}(i)=0$.

If the UE is not configured with an SCG or a PUCCH-SCell, and if the UE has PUSCH transmission with UCI on serving cell j and PUSCH without UCI in any of the remaining serving cells, and the total transmit power of the UE would exceed $\hat{P}_{CMAX}(i)$, the UE scales $\hat{P}_{PUSCH,c}(i)$ for the serving cells without UCI in subframe/such that the condition $$\sum_{c \neq j} w(i) \cdot \hat{P}_{PUSCH,c}(i) \leq \left(\hat{P}_{CMAX}(i) - \hat{P}_{PUSCH,j}(i)\right)$$

is satisfied where $\hat{P}_{PUSCH,j}(i)$ is the PUSCH transmit power for the cell with UCI and w(i) is a scaling factor of $\hat{P}_{PUSCH,c}(i)$ for serving cell c without UCI. In this case, no power scaling is applied to $\hat{P}_{PUSCH,j}(i)$ unless $$\sum_{c \neq j} w(i) \cdot \hat{P}_{PUSCH,c}(i) = 0$$

and the total transmit power of the UE still would exceed $\hat{P}_{CMAX}(i)$.

For a UE not configured with a SCG or a PUCCH-SCell, note that w(i) values are the same across serving cells when w(i)>0 but for certain serving cells w(i) may be zero.

If the UE is not configured with an SCG or a PUCCH-SCell, and if the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to $$\hat{P}_{PUSCH,j}(i) = \min\left(\hat{P}_{PUSCH,j}(i), \left(\hat{P}_{CMAX}(i) - \hat{P}_{PUCCH}(i)\right)\right)$$
and
$$\sum_{c \neq j} w(i) \cdot \hat{P}_{PUSCH,c}(i) \leq \left(\hat{P}_{CMAX}(i) - \hat{P}_{PUCCH}(i) - \hat{P}_{PUSCH,j}(i)\right)$$

If the UE is not configured with a SCG or a PUCCH-SCell, and

If the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG the UE shall adjust its total transmission power to not exceed $P_{CMAX}$ on any overlapped portion.

If the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG the UE shall adjust its total transmission power to not exceed $P_{CMAX}$ on any overlapped portion.

If the UE is configured with multiple TAGs, and if the SRS transmission of the UE in a symbol on subframe i for a given serving cell in a TAG overlaps with the PUCCH/PUSCH transmission on subframe i or subframe i+1 for a different serving cell in the same or another TAG the UE shall drop SRS if its total transmission power exceeds $P_{CMAX}$ on any overlapped portion of the symbol.

If the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s) the UE shall drop the SRS transmissions if the total transmission power exceeds $P_{CMAX}$ on any overlapped portion of the symbol.

If the UE is configured with multiple TAGs, the UE shall, when requested by higher layers, to transmit PRACH in a secondary serving cell in parallel with SRS transmission in a symbol on a subframe of a different serving cell belonging to a different TAG, drop SRS if the total transmission power exceeds $P_{CMAX}$ on any overlapped portion in the symbol.

If the UE is configured with multiple TAGs, the UE shall, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

SUMMARY

Systems and methods are disclosed herein for configuring a wireless device individually (i.e., separately) per uplink subframe set as to whether or not the wireless device can use uplink 256 Quadrature Amplitude Modulation (256QAM). In some embodiments, a method of operation of a network node comprises configuring a wireless device for use of a Modulation and Coding Scheme (MCS) table for uplink 256QAM separately per uplink subframe set for two or more uplink subframe sets. In some embodiments, the two or more uplink subframe sets are two or more uplink subframe sets for separate uplink power control. In this manner, 256QAM can be utilized in more subframes and, as a result, uplink data rate can be increased.

In some embodiments, configuring the wireless device for use of the MCS table for uplink 256QAM comprises configuring the wireless device to use the MCS table for uplink 256QAM for a first uplink subframe set of the two or more uplink subframe sets and configuring the wireless device to not use the MCS table for uplink 256QAM for a second uplink subframe set of the two or more uplink subframe sets.

In some embodiments, the method further comprises receiving an uplink transmission from the wireless device in a subframe in a first uplink subframe set of the two or more uplink subframe sets in accordance with the configured use of the MCS table for uplink 256QAM for the first uplink subframe set.

In some embodiments, the method further comprises receiving, as part of a synchronous Hybrid Automatic Repeat Request (HARQ) process, an initial uplink transmission from the wireless device in a subframe in a first uplink subframe set for which the wireless device is configured to use the MCS table for uplink 256QAM and receiving, as part of the synchronous HARQ process, a retransmission from the wireless device in a subframe in a second uplink subframe set for which the wireless device is configured to not use the MCS table for uplink 256QAM. Further, in some embodiments, the method further comprises scheduling, for the retransmission, a larger amount of resource elements for the retransmission than what is targeted by a corresponding Signal to Interference plus Noise Ratio (SINR) target for the retransmission. In some embodiments, receiving the retransmission comprises performing soft demodulation for the retransmission to provide a plurality of soft bits having corresponding reliabilities and setting one or more low reliability soft bits to zero. In some other embodiments, receiving the initial uplink transmission comprises performing soft demodulation for the initial uplink transmission to provide a plurality of soft bits having corresponding reliabilities and setting one or more low reliability soft bits to zero, and receiving the retransmission uplink transmission comprises performing soft demodulation for the retransmission to provide a plurality of soft bits having corresponding reliabilities, setting one or more low reliability soft bits to zero, and combining the soft bits for the retransmission with the soft bits for the initial uplink transmission or combining only the non-zero soft bits for the retransmission with the corresponding soft bits for the initial uplink transmission.

In some embodiments, the method further comprises receiving, as part of an asynchronous HARQ process, an initial uplink transmission from the wireless device in a subframe in a first uplink subframe set for which the wireless device is configured to use the MCS table for uplink 256QAM and receiving, as part of the asynchronous HARQ process, a retransmission from the wireless device in a subframe in the first uplink subframe set or another uplink subframe set for which the wireless device is configured to use the MCS table for uplink 256QAM.

In some embodiments, the network node is a radio access node.

Embodiments of a network node are also disclosed. In some embodiments, a network node comprises a processor and memory comprising instructions executable by the processor whereby the network node is operable to configure a wireless device for use of a MCS table for uplink 256QAM separately per uplink subframe set for two or more uplink subframe sets. In some embodiments, the two or more uplink subframe sets are two or more uplink subframe sets for separate uplink power control.

In some embodiments, in order to configure the wireless device for use of the MCS table for uplink 256QAM separately per uplink subframe set, the network node is further operable to configure the wireless device to use the MCS table for uplink 256QAM for a first uplink subframe set of the two or more uplink subframe sets and configure the wireless device to not use the MCS table for uplink 256QAM for a second uplink subframe set of the two or more uplink subframe sets.

In some embodiments, by execution of the instructions by the processor, the network node is further operable to receive an uplink transmission from the wireless device in a subframe in a first uplink subframe set of the two or more uplink subframe sets in accordance with the configured use of the MCS table for uplink 256QAM for the first uplink subframe set.

In some embodiments, the network node is a radio access node.

In some embodiments, a network node is adapted to perform the method of any one of the embodiments of the method of operation of a network node disclosed herein.

In some embodiments, a network node comprises a configuring module operable to configure a wireless device for use of a MCS table for uplink 256QAM separately per uplink subframe set for two or more uplink subframe sets.

Embodiments of a method of operation of a wireless device are also disclosed. In some embodiments, a method of operation of a wireless device comprises obtaining a separate configuration per uplink subframe set for two or more uplink subframe sets, wherein for each uplink subframe set of the two or more uplink subframe sets the separate configuration for the uplink subframe set is a configuration for use of a MCS table for uplink 256QAM. The method further comprises transmitting an uplink transmission in a subframe in one of the two or more uplink subframe sets in accordance with the separate configuration for use of the MCS table for uplink 256QAM for the one of the two or more uplink subframe sets. In some embodiments, the two or more uplink subframe sets are two or more uplink subframe sets for separate uplink power control.

In some embodiments, obtaining a separate configuration per uplink subframe set for two or more uplink subframe sets comprises obtaining a first configuration to use the MCS table for uplink 256QAM for a first uplink subframe set of the two or more uplink subframe sets and obtaining a second configuration to not use the MCS table for uplink 256QAM for a second uplink subframe set of the two or more uplink subframe sets.

Embodiments of a wireless device are also disclosed. In some embodiments, a wireless device comprises a transceiver, a processor, and memory storing instructions executable by the processor whereby the wireless device is operable to obtain a separate configuration per uplink subframe set for two or more uplink subframe sets, wherein for each uplink subframe set of the two or more uplink subframe sets the separate configuration for the uplink subframe set is a configuration for use of a MCS table for uplink 256QAM, and transmit, via the transceiver, an uplink transmission in a subframe in one of the two or more uplink subframe sets in accordance with the separate configuration for use of the MCS table for uplink 256QAM for the one of the two or more uplink subframe sets. In some embodiments, the two or more uplink subframe sets are two or more uplink subframe sets for separate uplink power control.

In some embodiments, in order to obtain a separate configuration per uplink subframe set for two or more uplink subframe sets, the wireless device is further operable to obtain a first configuration to use the MCS table for uplink 256QAM for a first uplink subframe set of the two or more uplink subframe sets and obtain a second configuration to not use the MCS table for uplink 256QAM for a second uplink subframe set of the two or more uplink subframe sets.

In some embodiments, a wireless device is adapted to perform the method of operation of a wireless device according to any of the embodiments disclosed herein.

In some embodiments, a wireless device comprises an obtaining module and a transmitting module. The obtaining module is operable to obtain a separate configuration per uplink subframe set for two or more uplink subframe sets, wherein for each uplink subframe set of the two or more uplink subframe sets the separate configuration for the uplink subframe set is a configuration for use of a MCS table for uplink 256QAM. The transmitting module is operable to transmit an uplink transmission in a subframe in one of the two or more uplink subframe sets in accordance with the separate configuration for use of the MCS table for uplink 256QAM for the one of the two or more uplink subframe sets.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8 illustrates an encoded transport block and coded bits stored by a terminal (soft buffer size).

FIG. 9 illustrates bits used in the first transmission and retransmissions are derived from a circular buffer. The size of the circular buffer matches the soft buffer size of the terminal.

FIG. 10 illustrates soft buffer allocation in Release 8 LTE when the Physical Downlink Shared Channel (PDSCH) transmission mode is other than mode 3, 4, or 8.

FIG. 11 illustrates soft buffer allocation in Release 8 LTE when the PDSCH transmission mode is mode 3, 4, or 8.

FIG. 13 is a flow chart that illustrates the operation of a network node such as, but not limited to, a radio access node according to some embodiments of the present disclosure.

FIG. 14 is a flow chart that illustrates the operation of a wireless device such as, but not limited to, a wireless device according to some embodiments of the present disclosure.

DETAILED DESCRIPTION

Figure 1:
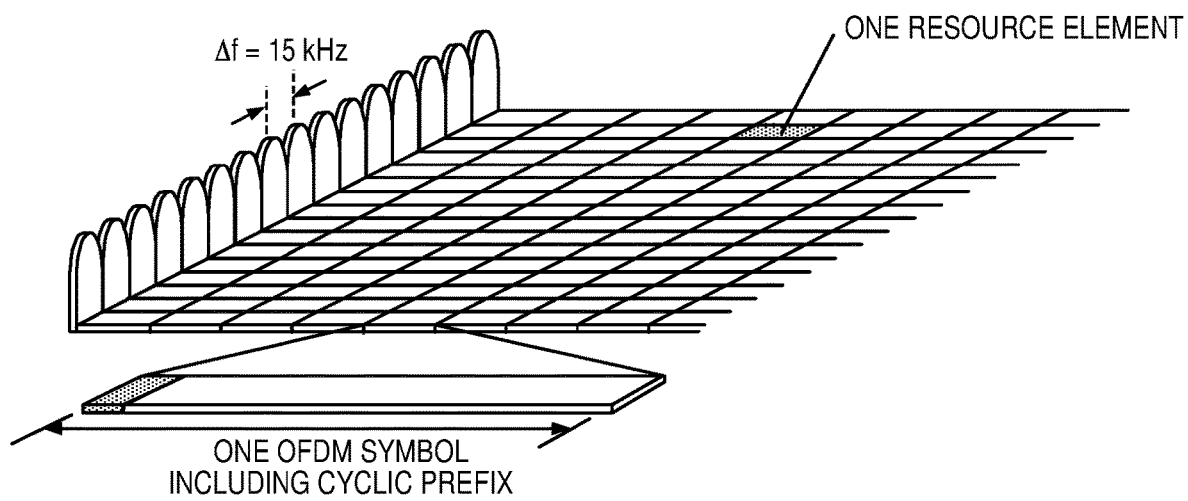
FIG. 1 illustrates a Long Term Evolution (LTE) downlink physical resource.
Figure 2:
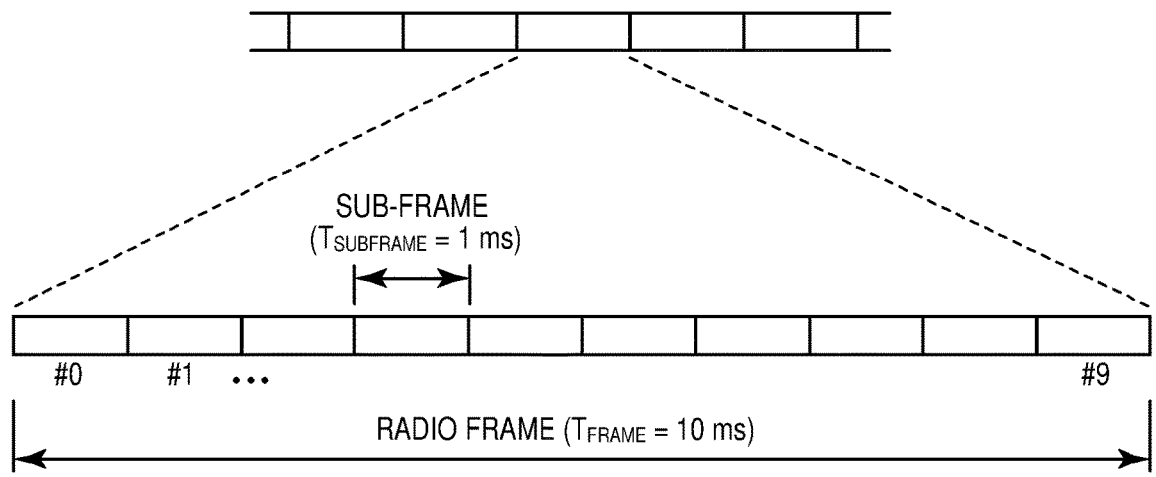
FIG. 2 illustrates an LTE time-domain structure.
Figure 3:
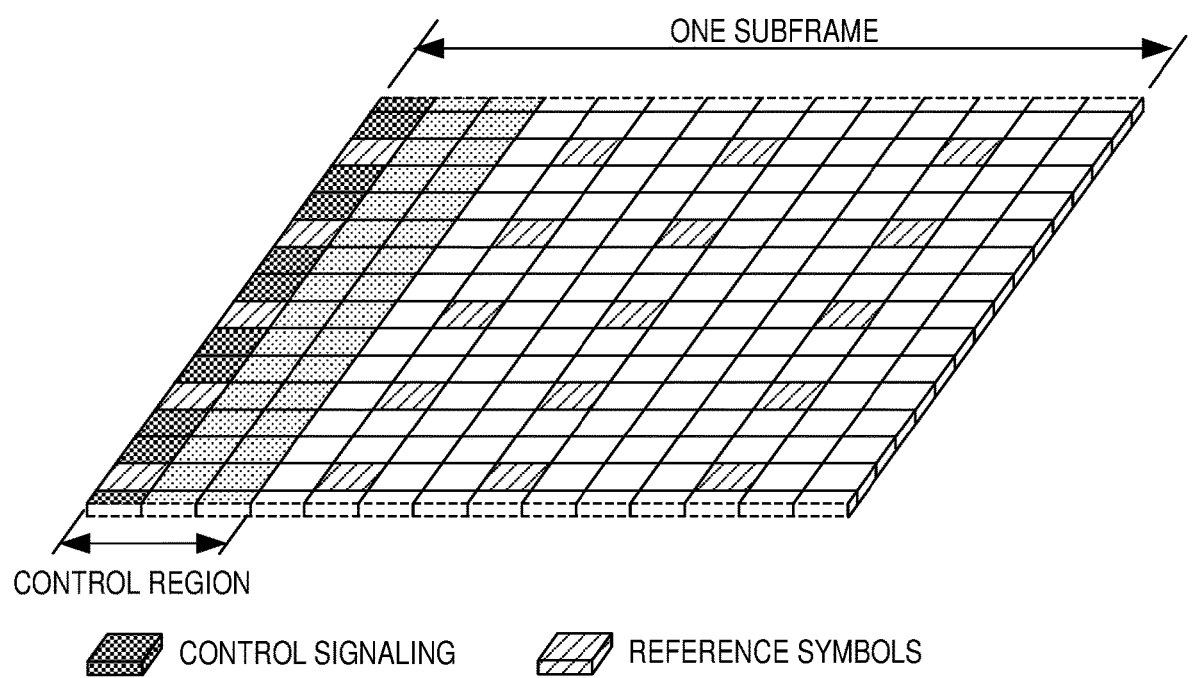
FIG. 3 illustrates a downlink subframe.
Figure 4:
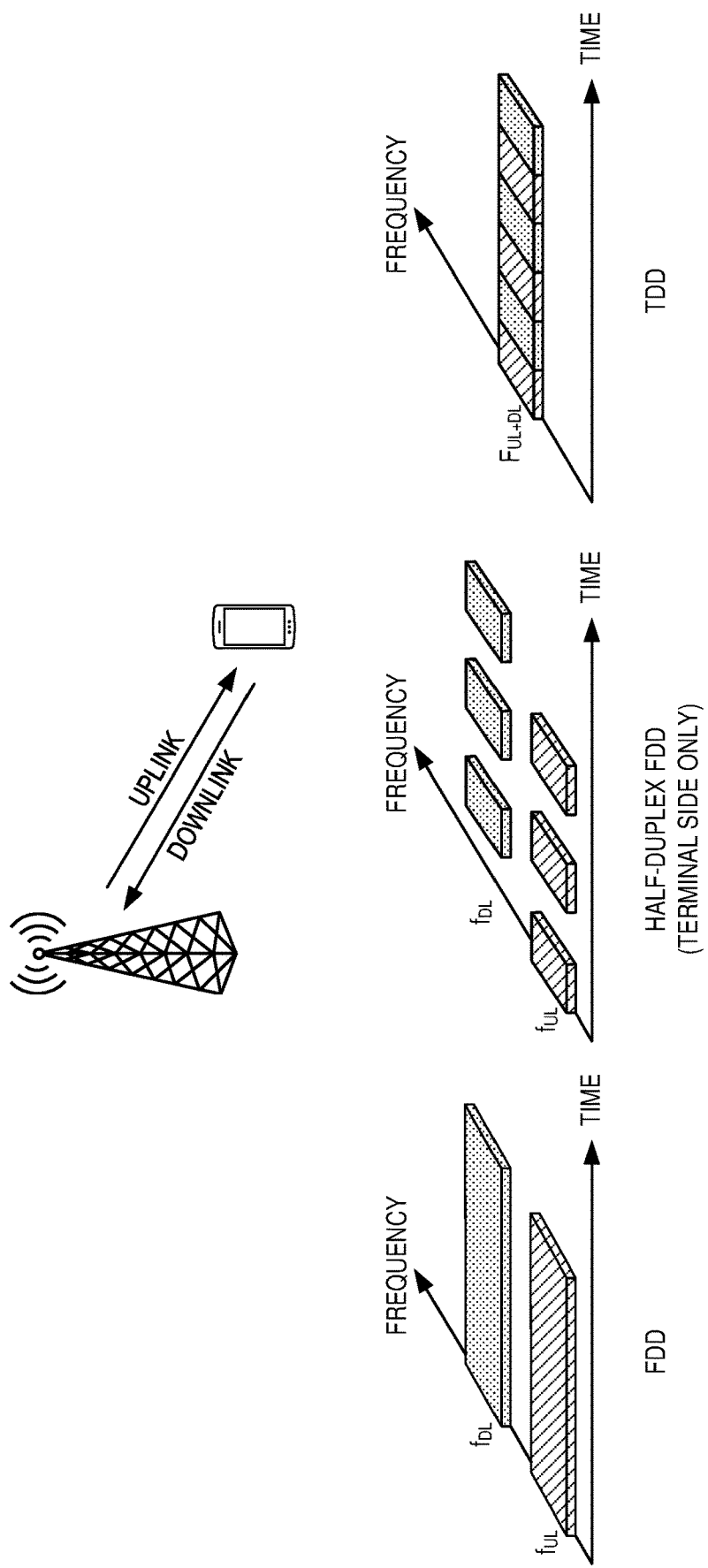
FIG. 4 illustrates Frequency Division Duplexing (FDD) and Time Division Duplexing (TDD).
Figure 5:
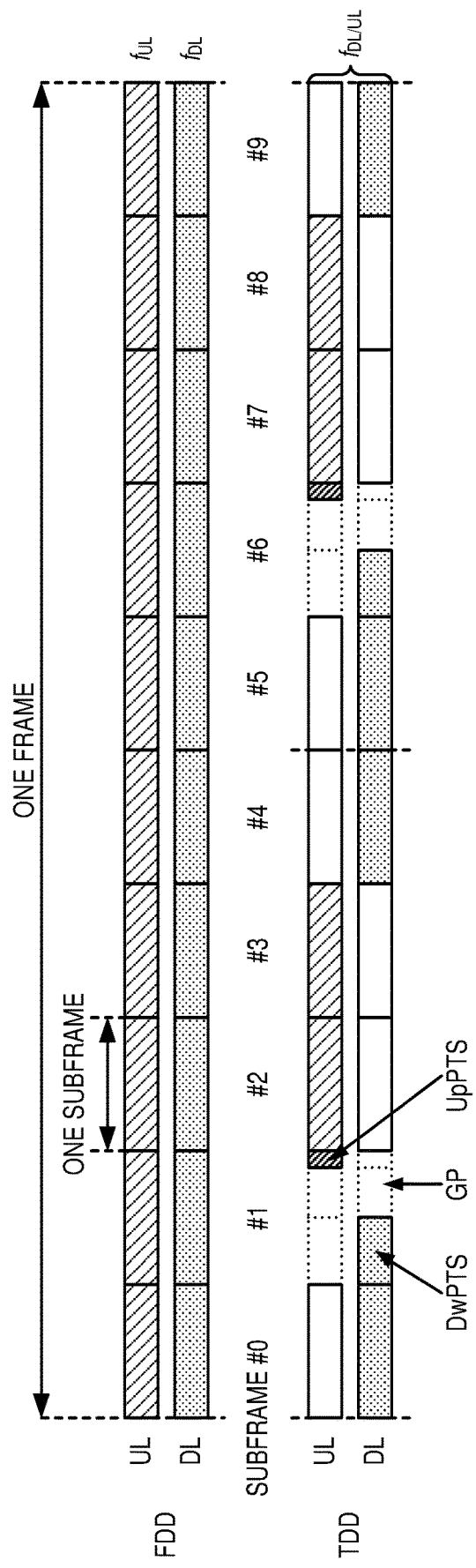
FIG. 5 illustrates uplink/downlink time/frequency structure for LTE in case of FDD and TDD.
Figure 6:
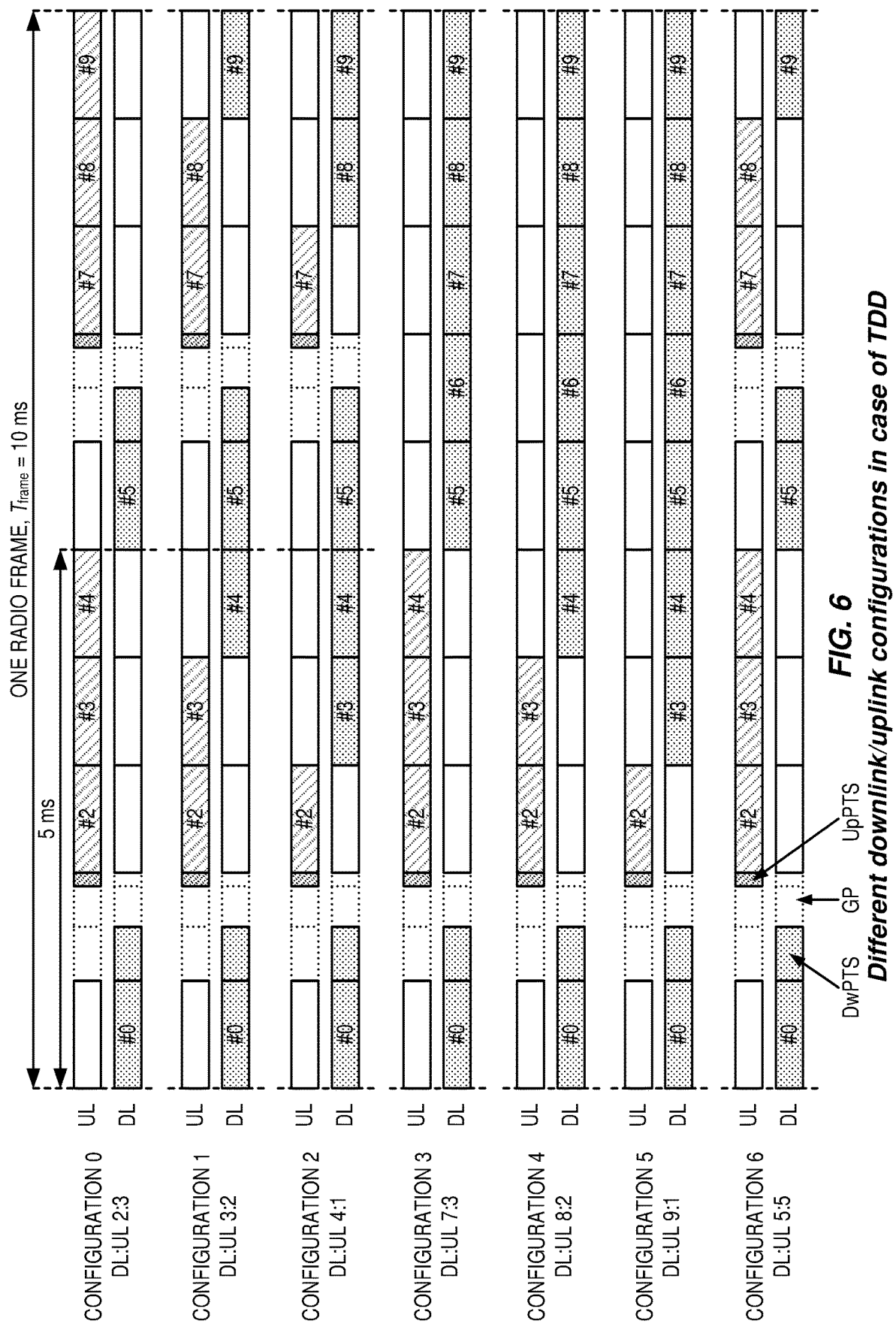
FIG. 6 illustrates different downlink/uplink configurations for TDD.
Figure 7:
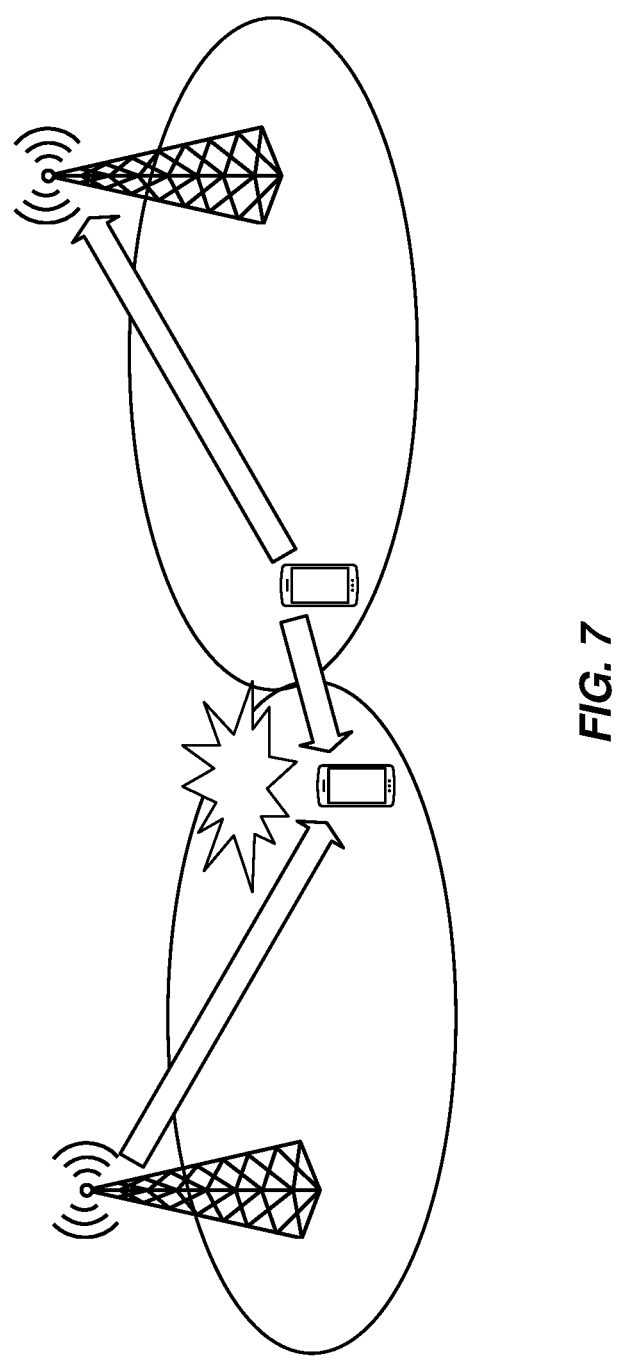
FIG. 7 illustrates different uplink/downlink interference for TDD.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The Third Generation Partnership Project (3GPP) has started work on uplink capacity enhancements for Long Term Evolution (LTE) enhanced Licensed Assisted Access (LAA) for LTE (see, e.g., RP-160664, New Work Item on Uplink Capacity Enhancements for LTE enhanced LAA for LTE, 3GPP RAN WG #71; Ericsson, CMCC). As part of these uplink enhancements, support for uplink 256 Quadrature Amplitude Modulation (256QAM) will be provided.

With the introduction of enhanced Interference Mitigation and Traffic Adaptation (eIMTA) in LTE Release 12, multiple uplink subsets were introduced. Power control parameters for the uplink subframe sets can be configured individually by different power control parameters to allow operation during different interference conditions. This impacts the usage of 256QAM in the uplink due to the possibility of different interference conditions in different uplink subframe sets. For example, the interference conditions in one of the uplink subframe sets may result in it being difficult to utilize 256QAM in that uplink subframe set, while the interference conditions in another uplink subframe set may result in it being possible to utilize 256QAM in that uplink subframe set. Hence, it could be beneficial to be able to configure a User Equipment (UE) individually per subframe set as to whether or not uplink 256QAM is utilized. Embodiments disclosed herein propose configuring the use of the Modulation and Coding Scheme (MCS) table for uplink 256QAM separately per uplink power control subframe set.

In this regard, systems and methods are disclosed herein for configuring a wireless device (e.g., a UE) individually (i.e., separately) per uplink subframe set as to whether or not the wireless device can use uplink 256QAM. In other words, a system and methods are disclosed herein for configuring the use of a MCS table for uplink 256QAM separately per uplink (e.g., power control) subframe set. For example, in an uplink subframe set in which the interference conditions result in it being possible to utilize 256QAM, the UE is configured to use the MCS table for uplink 256QAM. Conversely, in another uplink subframe set in which the interference conditions result in it being difficult to utilize 256QAM, the UE is configured to not use the MCS table for uplink 256QAM (e.g., the UE is configured to use another MCS table that does not support uplink 256QAM).

The described embodiments are produced in recognition of certain shortcomings of conventional approaches. In conventional approaches, where a UE is configured with different uplink subframes sets, the evolved Node B (eNB) may experience different interference levels in the different subframe sets when receiving transmissions. To compensate, the UE may use higher power in at least one of the sets. A problem that arises in this context is that the interference level may make it infeasible to use 256QAM in one of the sets, or alternatively it will significantly degrade performance.

Accordingly, certain embodiments configure the MCS table for uplink 256QAM separately per uplink subframe set in the UE. The eNB may employ optimized decoding assuming that the Signal to Interference plus Noise Ratio (SINR) is not good enough to decode uplink 256QAM. These and other embodiments described herein may allow more uplink subframes to use 256QAM, which can potentially increase the uplink data rate.

In some embodiments a UE is configured separately per uplink subframe set as to whether it is possible to use an MCS table containing 256QAM in uplink. If synchronous HARQ is applied, the following configuration aspect applies for an initial transmission, e.g. New Data Indicator (NDI) is equal to 1. For a case where a retransmission of a transport block that has initially been transmitted with 256QAM takes place in a subframe that is not part of the uplink subframe set configured with uplink 256QAM MCS is described further below. If asynchronous Hybrid Automatic Repeat Request (HARQ) is applied, the eNB can operate a set of HARQ processes that is used for subframes that are configured with the MCS table supporting uplink 256QAM and some that are configured with an MCS table not supporting uplink 256QAM.

In some other embodiments, a retransmission of uplink 256QAM transmission occurs in a subframe that is part of a subframe set with higher interference. An alternative is also that an initial transmission of an uplink 256QAM transmission takes place in the same subframe. The eNB can take one or several of the following actions to compensate for the higher interference:

Schedule a larger amount of resource elements for the given retransmission than what is targeted by its SINR target.

In the process of decoding the coded bits, the eNB can only consider different reliability of the soft bits computed from the modulation symbols. For instance, from a LTE 256QAM symbol, eight soft bits are produced by the soft demodulator. The first pair of soft bits have the highest reliability and magnitude. The next pairs in sequence have lower and lower reliability and magnitudes. In one non-limiting implementation, the receiver can set the soft bits of the less reliable bits to zeros to reduce the negative impact of the interference. For instance, if the four least reliable bits are set to zero, the receiver is effectively treating the received signal as a 16QAM, which is more resistant to interference than a 256QAM. In a further non-limiting implementation, if the receiver infers substantially high interference is present (for instance, by checking the residual errors in the demodulation reference symbols), the receiver can set six least reliable soft bits to zero (i.e., treating the signal as a Quadrature Phase Shift Keying (QPSK)) or sets all soft bits to zero (thereby discarding the highly contaminated transmission).

In the decoding processes this can be considered for an initial transmission. For a retransmission, the eNB can choose to only combine the above bits with the corresponding soft bits stored in the eNB. In other words, for an initial uplink transmission, the eNB can perform soft demodulation to provide soft bits having corresponding reliabilities and set one or more of the low reliability soft bits to zero. The eNB can then perform soft demodulation for a retransmission to provide soft bits for the retransmission having corresponding reliabilities, set one or more of the low reliability soft bits to zero, and combine the soft bits for the initial uplink transmission with the corresponding soft bits for the retransmission or combine only the non-zero soft bits for the retransmission with the corresponding soft bits for the initial uplink transmission.

In the storing of bits if the eNB fails to decode the initial transmission or a retransmission the eNB can decide to store only the more reliable soft bits (and discard the less reliable bits). This is particularly useful when the transmission is received in a subframe with higher expected interference levels.

The described embodiments may be implemented in any appropriate type of communication system supporting any suitable communication standards and using any suitable components. As one example, certain embodiments may be implemented in an LTE network, such as that illustrated in FIG. 12.

Figure 12:
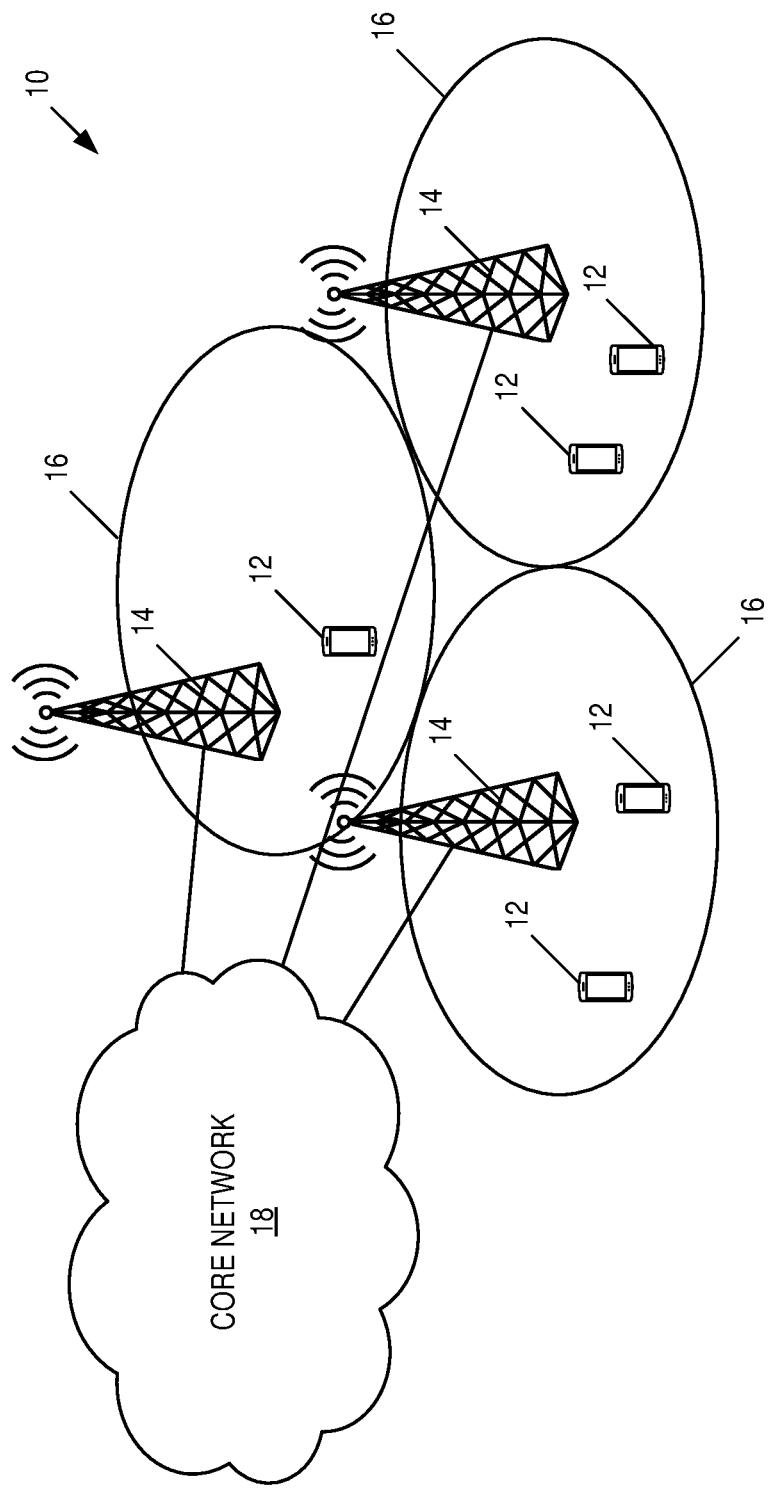
FIG. 12 is a diagram illustrating an LTE network.

Referring to FIG. 12, a communication network 10 comprises a plurality of wireless communication devices 12 (e.g., conventional UEs, Machine Type Communication (MTC)/Machine-to-Machine (M2M) UEs) and a plurality of radio access nodes 14 (e.g., eNBs or other base stations). The communication network 10 is organized into cells 16, which are connected to a core network 18 via corresponding to radio access nodes 14. The radio access nodes 14 are capable of communicating with the wireless communication devices 12 (also referred to herein as wireless devices 12) along with any additional elements suitable to support communication between wireless communication devices or between a wireless communication device and another communication device (such as a landline telephone).

FIG. 13 is a flow chart that illustrates the operation of a network node such as, but not limited to, the radio access node 14 according to some embodiments of the present disclosure. As discussed above, the network node configures a wireless device 12 for use of a MCS table for uplink 256QAM separately per uplink (e.g., power control) subframe set (step 100). For example, the network node may configure the wireless device 12 to use the MCS table for uplink 256QAM for one uplink subframe set and configure the wireless device 12 not to use the MCS table for uplink 256QAM for another uplink subframe set. As discussed above, in some embodiments, the uplink subframe sets are uplink subframe sets for which uplink power control parameters can be separately configured based on different interference conditions in the uplink subframe sets. While any suitable technique may be used to provide the configuration, in some embodiments, the network node is a radio access node 14, and the configuration is provided via control signaling such as, for example, Radio Resource Control (RRC) signaling. Optionally (as indicated by the dashed lines), the network node receives an uplink transmission from the wireless device 12 in a subframe in accordance with the configuration of the wireless device 12 for use of the MCS table for uplink 256QAM for the corresponding uplink subframe set (step 102).

FIG. 14 is a flow chart that illustrates the operation of a wireless device such as, but not limited to, the wireless device 12 of FIG. 12 according to some embodiments of the present disclosure. As discussed above, the wireless device obtains a separate configuration per uplink (e.g., power control) subframe set for use of a MCS table for uplink 256QAM (step 200). For example, the wireless device may obtain a configuration to use the MCS table for uplink 256QAM for one uplink subframe set and obtain another configuration to not use the MCS table for uplink 256QAM for another uplink subframe set. As discussed above, in some embodiments, the uplink subframe sets are uplink subframe sets for which uplink power control parameters can be separately configured based on different interference conditions in the uplink subframe sets. While any suitable technique may be used to obtain the separate configuration per uplink subframe set, in some embodiments, the wireless device receives the separate configuration per uplink subframe set via control signaling such as, for example, RRC signaling. Optionally (as indicated by the dashed lines), the wireless device transmits an uplink transmission to, e.g., the radio access node 14 in a subframe in accordance with the configuration of the wireless device 12 for use of the MCS table for uplink 256QAM for the corresponding uplink subframe set (step 202).

As also discussed above, the separate configuration of the use of the MCS table for uplink 256QAM can be used together with either synchronous or asynchronous HARQ. As will be appreciated by one of ordinary skill in the art, when using synchronous HARQ, the wireless device 12 transmits an initial transmission at a known time $t_0$ and thereafter receives an Acknowledgement/Negative Acknowledgement (ACK/NACK) for the initial transmission at a defined time $t_1$, where for LTE $t_1=t_0+4$ milliseconds (ms). If the wireless device 12 receives a NACK, then the wireless device 12 transmits a retransmission at a defined time $t_2$, where for LTE $t_2=t_1+4$ ms, and the HARQ process continues in this manner until the wireless device 12 receives an ACK. An issue arises when synchronous HARQ in that the initial transmission may occur in a subframe that is in an uplink subframe set for which the wireless device 12 is configured to use the MCS table for uplink 256QAM but a retransmission may occur in a subframe that is in another uplink subframe set for which the wireless device 12 is configured to not use the MCS table for uplink 256QAM.

Figure 15:
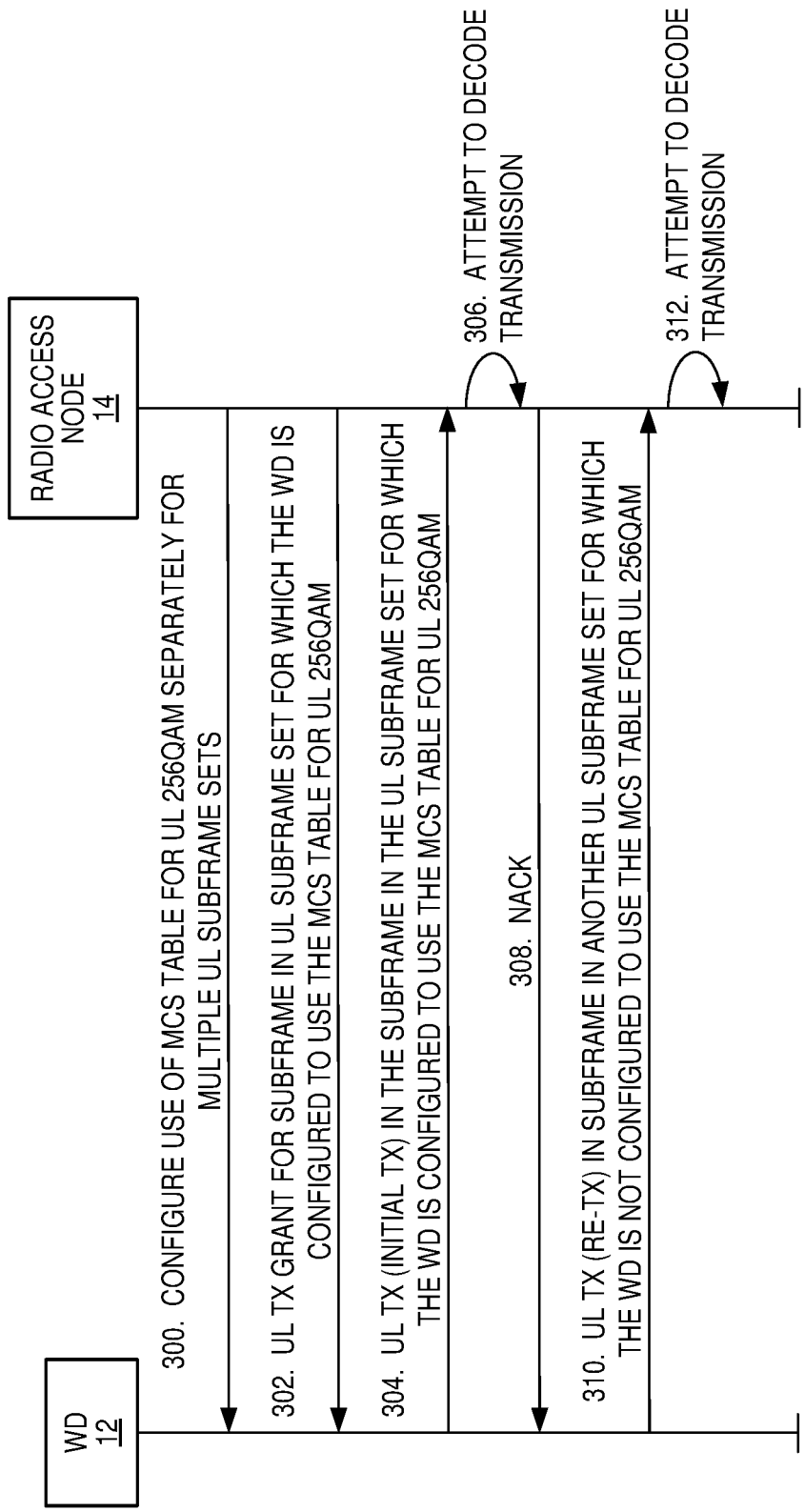
FIG. 15 illustrates the use of separate configuration of the use of the Modulation and Coding Scheme (MCS) table for uplink 256 Quadrature Amplitude Modulation (QAM) together with synchronous Hybrid Automatic Repeat Request (HARQ) according to some embodiments of the present disclosure.

In this regard, FIG. 15 illustrates the use of separate configuration of the use of the MCS table for uplink 256QAM together with synchronous HARQ according to some embodiments of the present disclosure. As illustrated, the radio access node 14 separately configures the use of the MCS table for uplink 256QAM by the wireless device 12 separately for multiple (i.e., two or more) uplink subframe sets, as described above (step 300). The radio access node 14 transmits an uplink grant to the wireless device 12, as will be appreciated by one of skill in the art (step 302). In this example, the uplink grant is for an uplink transmission in a subframe that is within an uplink subframe set for which the wireless device 12 is configured to use the MCS table for uplink 256QAM. In accordance with synchronous HARQ, the wireless device 12 transmits an initial uplink transmission in accordance with the uplink grant and the configured use of the MCS table for uplink 256QAM (step 304).

The radio access node 14 attempts to decode the initial uplink transmission (step 306). In this example, the radio access node 14 is unable to successfully decode the initial uplink transmission and, as such, transmits a NACK to the wireless device 12 at a predefined time in accordance with the synchronous HARQ procedure (step 308). Upon receiving the NACK, the wireless device 12 transmits a retransmission at a predefined time in accordance with the synchronous HARQ procedure (step 310). In this example, the required timing for the retransmission for the synchronous HARQ procedure places the retransmission in a subframe that is within an uplink subframe set for which the wireless device 12 is not configured to use the MCS table for uplink 256QAM. However, the retransmission uses the same transmit parameters as configured for the initial transmission. These transmit parameters may include a 256QAM determined for the initial transmission using the MCS table for uplink 256QAM. As such, the retransmission may use 256QAM even though the retransmission occurs in a subframe for which the wireless device 12 is configured to not use the MCS table for uplink 256QAM. The radio access node 14 attempts to decode the retransmission in accordance with the synchronous HARQ procedure (step 312). The synchronous HARQ procedure continues in this manner until, e.g., the radio access node 14 is able to successfully decode the transmission.

As discussed above, in order to compensate for potentially higher interference in the subframe in which the retransmission is transmitted, one or more of the following actions may be taken, as described above:

The radio access node 14 may schedule a larger amount of resource elements for the retransmission than what is targeted by its SINR target.
In the process of decoding the coded bits, the radio access node 14 (i.e., the eNB for LTE) can only consider different reliability of the soft bits computed from the modulation symbols. For instance, from a LTE 256QAM symbol, eight soft bits are produced by the soft demodulator. The first pair of soft bits have the highest reliability and magnitude. The next pairs in sequence have lower and lower reliability and magnitudes. In one non-limiting implementation, the receiver at the radio access node 14 can set the soft bits of the less reliable bits to zeros to reduce the negative impact of the interference. For instance, if the four least reliable bits are set to zero, the receiver at the radio access node 14 is effectively treating the received signal as a 16QAM, which is more resistant to interference than a 256QAM. In a further non-limiting implementation, if the receiver at the radio access node 14 infers substantially high interference is present (for instance, by checking the residual errors in the demodulation reference symbols), the receiver at the radio access node 14 can set six least reliable soft bits to zero (i.e., treating the signal as a QPSK) or sets all soft bits to zero (thereby discarding the highly contaminated transmission).

In the storing of bits, if the radio access node 14 fails to decode the initial transmission or a retransmission, the radio access node 14 can decide to store only the more reliable soft bits (and discard the less reliable bits). This is particularly useful when the transmission is received in a subframe with higher expected interference levels.

Figure 16:
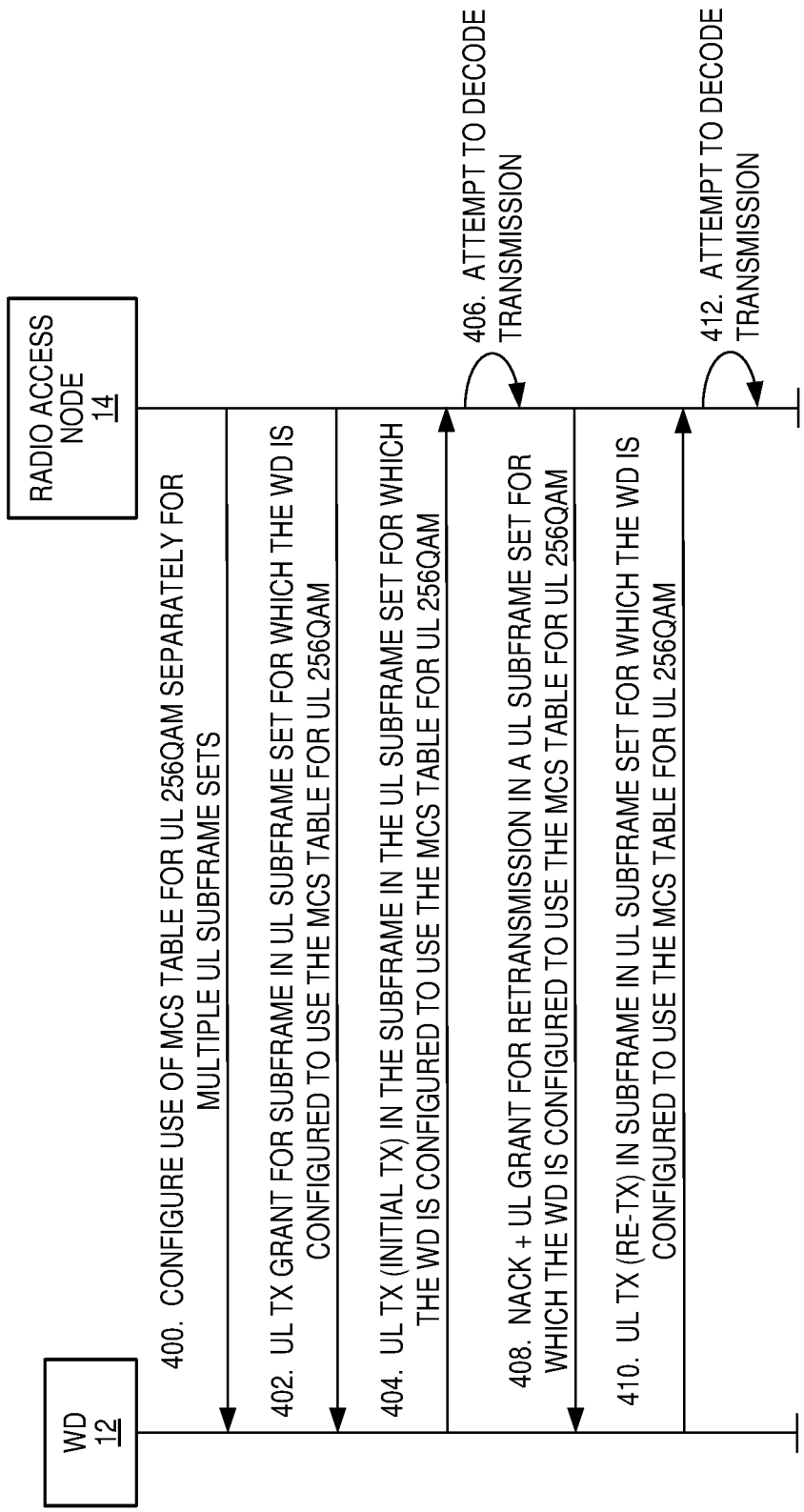
FIG. 16 illustrates the use of separate configuration of the use of the MCS table for uplink 256QAM together with asynchronous HARQ according to some embodiments of the present disclosure.

FIG. 16 illustrates the use of separate configuration of the use of the MCS table for uplink 256QAM together with asynchronous HARQ according to some embodiments of the present disclosure. As illustrated, the radio access node 14 separately configures the use of the MCS table for uplink 256QAM by the wireless device 12 separately for multiple (i.e., two or more) uplink subframe sets, as described above (step 400). The radio access node 14 transmits an uplink grant to the wireless device 12, as will be appreciated by one of skill in the art (step 404). In this example, the uplink grant is for an uplink transmission in a subframe that is within an uplink subframe set for which the wireless device 12 is configured to use the MCS table for uplink 256QAM. In accordance with asynchronous HARQ, the wireless device 12 transmits an initial uplink transmission in accordance with the uplink grant and the configured use of the MCS table for uplink 256QAM (step 404).

The radio access node 14 attempts to decode the initial uplink transmission (step 406). In this example, the radio access node 14 is unable to successfully decode the initial uplink transmission. Rather than transmitting a NACK at a predefined time as required for synchronous HARQ, for asynchronous HARQ, the radio access node 14 decides when to transmit the NACK along with or as part of (e.g., implied by) an uplink grant for a retransmission. In this example, the radio access node 14 transmits the NACK and uplink grant for a retransmission, where the grant is for an uplink subframe that is within the same or a different uplink subframe set for which the wireless device 12 is configured to use the MCS table for uplink 256QAM (step 408). Upon receiving the uplink grant and NACK, the wireless device 12 transmits a retransmission in the subframe indicated in the uplink grant for the retransmission (step 410). The radio access node 14 attempts to decode the retransmission in accordance with the asynchronous HARQ procedure (step 412). The asynchronous HARQ procedure continues in this manner until, e.g., the radio access node 14 is able to successfully decode the transmission.

Figure 17:
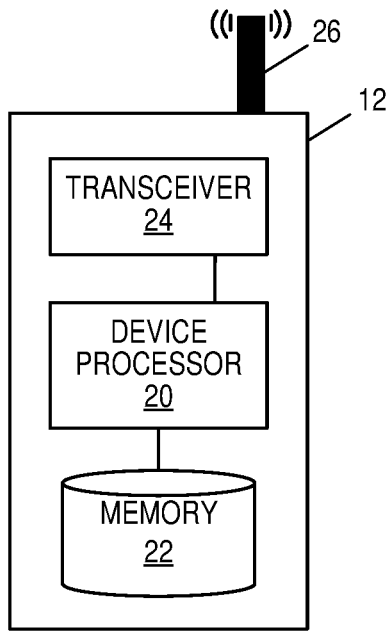
FIGS. 17 and 18 illustrate example embodiments of a wireless communication device.
Figure 18:
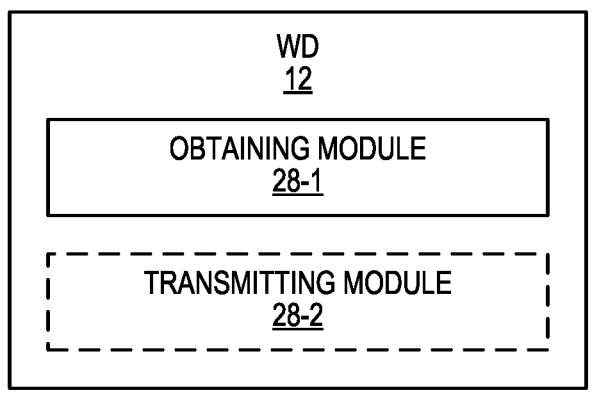

Although wireless communication devices 12 may represent communication devices that include any suitable combination of hardware and/or software, these wireless communication devices may, in certain embodiments, represent devices such as example wireless communication devices illustrated in greater detail by FIGS. 17 and 18. Similarly, although the illustrated radio access node 14 may represent network nodes that include any suitable combination of hardware and/or software, these nodes may, in particular embodiments, represent devices such as example radio access nodes 14 illustrated in greater detail by FIGS. 19 and 20.

Referring to FIG. 17, a wireless communication device 12 comprises a processor 20, a memory 22, a transceiver 24, and an antenna(s) 26. As will be appreciated by one of skill in the art, the processor 20 includes, e.g., a Central Processing Unit(s) (CPU(s)), Digital Signal Processor(s) (DSP(s)), Application Specific Integrated Circuit(s) (ASIC(s)), and/or the like. In certain embodiments, some or all of the functionality described as being provided by UEs, MTC or M2M devices, and/or any other types of wireless communication devices 12 may be provided by the processor 20 executing instructions stored on a computer-readable medium, such as the memory 22 shown in FIG. 17. Alternative embodiments may include additional components beyond those shown in FIG. 17 that may be responsible for providing certain aspects of the device's functionality, including any of the functionality described herein.

As illustrated in FIG. 18, in some other embodiments, the wireless device 12 includes a number of modules 28, each of which is implemented in software. In this example, the modules 28 include an obtaining module 28-1 and, optionally, a transmitting module 28-2. The obtaining module 28-1 is operable to obtain the separate configurations for use of the MCS table for uplink 256QAM for multiple uplink subframe sets, as described above. The transmitting module 28-2 is operable to transmit an uplink transmission(s) in accordance with the separate configurations for use of the MCS table for uplink 256QAM, as described above.

Figure 19:
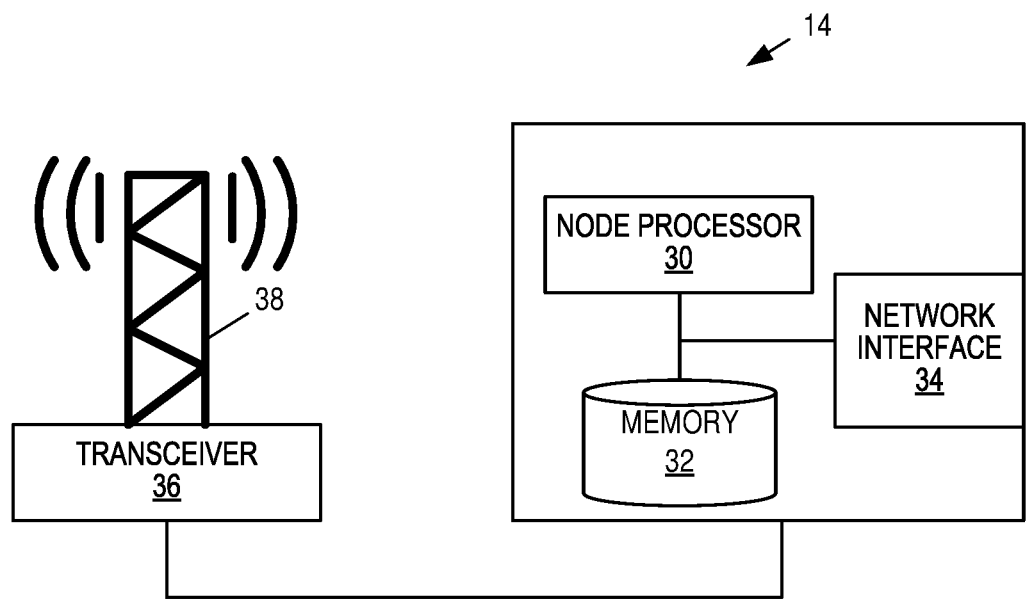
FIGS. 19 and 20 illustrate example embodiments of a radio access node.

Referring to FIG. 19, a radio access node 14 comprises a processor 30, a memory 32, a network interface 34, a transceiver 36, and an antenna(s) 38. As will be appreciated by one of skill in the art, the processor 30 includes, e.g., a CPU(s), DSP(s), ASIC(s), and/or the like. In certain embodiments, some or all of the functionality described as being provided by a base station, a node B, an eNB, and/or any other type of network node may be provided by the processor 30 executing instructions stored on a computer-readable medium, such as the memory 32 shown in FIG. 19. Alternative embodiments of the radio access node 14 may comprise additional components to provide additional functionality, such as the functionality described herein and/or related supporting functionality.

Figure 20:
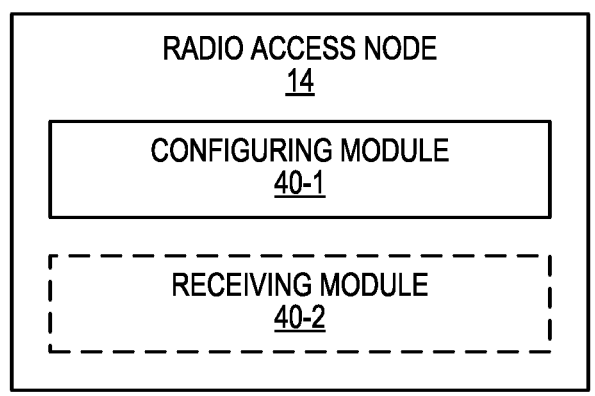

As illustrated in FIG. 20, in some other embodiments, the radio access node 14 includes a number of modules 40, each of which is implemented in software. In this example, the modules 40 include a configuring module 40-1 and, optionally, a receiving module 40-2. The configuring module 40-1 is operable to configuration a wireless device 12 for use of the MCS table for uplink 256QAM separately for multiple uplink subframe sets, as described above. The receiving module 40-2 is operable to receive an uplink transmission(s) in accordance with the separate configurations for use of the MCS table for uplink 256QAM, as described above.

While the disclosed subject matter has been presented above with reference to various embodiments, it will be understood that various changes in form and details may be made to the described embodiments without departing from the overall scope of the disclosed subject matter.

The following acronyms are used throughout this disclosure.

3GPP Third Generation Partnership Project
ACK Acknowledgement
ASIC Application Specific Integrated Circuit
CFI Control Format Indicator
CPU Central Processing Unit
DFT Discrete Fourier Transform
DSP Digital Signal Processor
DwPTS Downlink Pilot Time Slot
eIMTA Enhanced Interference Mitigation and Traffic Adaptation
eNB Evolved Node B
EPDCCH Enhanced Physical Downlink Control Channel
FDD Frequency Division Duplexing
GP Guard Period
HARQ Hybrid Automatic Repeat Request
LAA License Assisted Access
LTE Long Term Evolution
M2M Machine-to-Machine
MCS Modulation and Coding Scheme
MIMO Multiple-Input-Multiple-Output
ms Millisecond
MTC Machine Type Communication
NACK Negative Acknowledgement
NDI New Data Indictor
OFDM Orthogonal Frequency Division Multiple Access
PDCCH Physical Downlink Control Channel
PDSCH Physical Downlink Shared Channel
PRB Physical Resource Block
QAM Quadrature Amplitude Modulation
QPSK Quadrature Phase Shift Keying
RRC Radio Resource Control
SINR Signal to Interference plus Noise Ratio
TDD Time Division Duplexing
TS Technical Specification
UE User Equipment
UpPTS Uplink Pilot Time Slot
VRB Virtual Resource Block Those skilled in the art will recognize improvements and modifications to the embodiments of the present disclosure. All such improvements and modifications are considered within the scope of the concepts disclosed herein.

What is claimed is:

1. A method of operation of a network node, comprising:
configuring a wireless device with a different set of one or more uplink power control parameters for corresponding ones of two or more uplink subframe sets;
configuring the wireless device for use of a Modulation and Coding Scheme, MCS, table for uplink 256 Quadrature Amplitude Modulation, QAM, separately per uplink subframe set for the two or more uplink subframe sets;
receiving, as part of a synchronous Hybrid Automatic Repeat Request, HARQ, process, an initial uplink transmission from the wireless device in a subframe in a first uplink subframe set for which the wireless device is configured to use the MCS table for uplink 256QAM; and
receiving, as part of the synchronous HARQ process, a retransmission from the wireless device in a subframe in a second uplink subframe set for which the wireless device is configured to not use the MCS table for uplink 256QAM.

2. The method of claim 1 wherein the different sets of one or more uplink power control parameters accommodate separate interference conditions associated with corresponding ones of the two or more uplink subframe sets.

3. The method of claim 1 wherein configuring the wireless device for use of the MCS table for uplink 256QAM comprises:
configuring the wireless device to use the MCS table for uplink 256QAM for a first uplink subframe set of the two or more uplink subframe sets; and
configuring the wireless device to not use the MCS table for uplink 256QAM for a second uplink subframe set of the two or more uplink subframe sets.

4. The method of claim 1 further comprising:
receiving an uplink transmission from the wireless device in a subframe in a first uplink subframe set of the two or more uplink subframe sets in accordance with the configured use of the MCS table for uplink 256QAM for the first uplink subframe set.

5. The method of claim 1 further comprising scheduling, for the retransmission, a larger amount of resource elements for the retransmission than what is targeted by a corresponding Signal to Interference plus Noise Ratio, SINR, target for the retransmission.

6. The method of claim 1 wherein receiving the retransmission comprises:
performing soft demodulation for the retransmission to provide a plurality of soft bits having corresponding reliabilities; and
setting one or more low reliability soft bits to zero.

7. The method of claim 1 wherein:
receiving the initial uplink transmission comprises:
performing soft demodulation for the initial uplink transmission to provide a plurality of soft bits having corresponding reliabilities; and
setting one or more low reliability soft bits to zero; and
receiving the retransmission uplink transmission comprises:
performing soft demodulation for the retransmission to provide a plurality of soft bits having corresponding reliabilities;
setting one or more low reliability soft bits to zero; and
combining the soft bits for the retransmission with the soft bits for the initial uplink transmission or combining only the non-zero soft bits for the retransmission with the corresponding soft bits for the initial uplink transmission.

8. The method of claim 1 further comprising:
receiving, as part of an asynchronous Hybrid Automatic Repeat Request, HARQ, process, an initial uplink transmission from the wireless device in a subframe in a first uplink subframe set for which the wireless device is configured to use the MCS table for uplink 256QAM; and
receiving, as part of the asynchronous HARQ process, a retransmission from the wireless device in a subframe in the first uplink subframe set or another uplink subframe set for which the wireless device is configured to use the MCS table for uplink 256QAM.

9. A network node, comprising:
a processor; and
memory comprising instructions executable by the processor whereby the network node is operable to:
configure a wireless device with a different set of one or more uplink power control parameters for corresponding ones of two or more uplink subframe sets to accommodate different interference conditions;
configure the wireless device for use of a Modulation and Coding Scheme, MCS, table for uplink 256 Quadrature Amplitude Modulation, QAM, separately per uplink subframe set for the two or more uplink subframe sets;
receive, as part of a synchronous HARQ process, an initial uplink transmission from the wireless device in a subframe in a first uplink subframe set for which the wireless device is configured to use the MCS table for uplink 256QAM; and
receive, as part of the synchronous HARQ process, a retransmission from the wireless device in a subframe in a second uplink subframe set for which the wireless device is configured to not use the MCS table for uplink 256QAM.

10. The network node of claim 9 wherein the different sets of one or more uplink power control parameters accommodate separate interference conditions associated with corresponding ones of the two or more uplink subframe sets.

11. The network node of claim 9 wherein, in order to configure the wireless device for use of the MCS table for uplink 256QAM separately per uplink subframe set, the network node is further operable to:
configure the wireless device to use the MCS table for uplink 256QAM for a first uplink subframe set of the two or more uplink subframe sets; and
configure the wireless device to not use the MCS table for uplink 256QAM for a second uplink subframe set of the two or more uplink subframe sets.

12. The network node of claim 9 wherein, by execution of the instructions by the processor, the network node is further operable to:
receive an uplink transmission from the wireless device in a subframe in a first uplink subframe set of the two or more uplink subframe sets in accordance with the configured use of the MCS table for uplink 256QAM for the first uplink subframe set.

13. The network node of claim 9 wherein the network node is a radio access node.

14. A method of operation of a wireless device, comprising:
obtaining a separate configuration per uplink subframe set for the two or more uplink subframe sets, wherein for each uplink subframe set of the two or more uplink subframe sets the separate configuration for the uplink subframe set includes:
a different set of one or more uplink power control parameters, and
a configuration for use of a Modulation and Coding Scheme, MCS, table for uplink 256 Quadrature Amplitude Modulation, QAM; and
transmitting, as part of a synchronous HARQ process, an initial uplink transmission in a subframe in a first one of the two or more uplink subframe sets for which the wireless device is configured to use the MCS table for uplink 256QAM; and
transmitting, as part of the synchronous HARQ process, a retransmission in a subframe in a second one of the two or more uplink subframe sets for which the wireless device is configured to not use the MCS table for uplink 256QAM.

15. The method of claim 14 wherein the different sets of one or more uplink power control parameters accommodate separate interference conditions associated with corresponding ones of the two or more uplink subframe sets.

16. The method of claim 14 wherein obtaining a separate configuration per uplink subframe set for two or more uplink subframe sets comprises:
   obtaining a first configuration to use the MCS table for uplink 256QAM for a first uplink subframe set of the two or more uplink subframe sets; and
   obtaining a second configuration to not use the MCS table for uplink 256QAM for a second uplink subframe set of the two or more uplink subframe sets.

17. A wireless device, comprising:
   a transceiver;
   a processor; and
   memory storing instructions executable by the processor whereby the wireless device is operable to:
      obtain a separate configuration per uplink subframe set for two or more uplink subframe sets, wherein for each uplink subframe set of the two or more uplink subframe sets the separate configuration for the uplink subframe set includes:
         a different set of one or more uplink power control parameters, and
         a configuration for use of a Modulation and Coding Scheme, MCS, table for uplink 256 Quadrature Amplitude Modulation, QAM; and
      transmit, via the transceiver and as part of a synchronous HARQ process, an initial uplink transmission in a subframe in a first one of the two or more uplink subframe sets for which the wireless device is configured to use the MCS table for uplink 256QAM; and
      transmit, as part of the synchronous HARQ process, a retransmission in a subframe in a second one of the two or more uplink subframe sets for which the wireless device is configured to not use the MCS table for uplink 256QAM.

18. The wireless device of claim 17 wherein the different sets of one or more uplink power control parameters accommodate separate interference conditions associated with corresponding ones of the two or more uplink subframe sets.

19. The wireless device of claim 17 wherein, in order to obtain a separate configuration per uplink subframe set for two or more uplink subframe sets, the wireless device is further operable to:
   obtain a first configuration to use the MCS table for uplink 256QAM for a first uplink subframe set of the two or more uplink subframe sets; and
   obtain a second configuration to not use the MCS table for uplink 256QAM for a second uplink subframe set of the two or more uplink subframe sets.

20. The method of claim 1, wherein the different sets of one or more uplink power control parameters include at least one of a nominal power level parameter and a path-loss compensation factor parameter.

21. The method of claim 14, wherein the different sets of one or more uplink power control parameters include at least one of a nominal power level parameter and a path-loss compensation factor parameter.

* * * * *